United States Patent
Kawasaki et al.

(10) Patent No.: US 7,179,360 B2
(45) Date of Patent: Feb. 20, 2007

(54) SOFT MAGNETIC FILM HAVING IMPROVED SATURATED MAGNETIC FLUX DENSITY, MAGNETIC HEAD USING THE SAME, AND MANUFACTURING METHOD THEREFORE

(75) Inventors: Mitsuo Kawasaki, Niigata-ken (JP); Yoshihiro Kanada, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 359 days.

(21) Appl. No.: 10/616,169

(22) Filed: Jul. 9, 2003

(65) Prior Publication Data
US 2005/0011590 A1 Jan. 20, 2005

Related U.S. Application Data

(62) Division of application No. 10/042,085, filed on Jan. 8, 2002, now Pat. No. 6,714,380.

(30) Foreign Application Priority Data
Jan. 15, 2001 (JP) ............................. 2001-005906

(51) Int. Cl.
*C25D 5/18* (2006.01)
*C25D 3/56* (2006.01)

(52) U.S. Cl. ..................... 205/104; 205/119; 205/255

(58) Field of Classification Search ................ 205/104, 205/119, 255
See application file for complete search history.

(56) References Cited

U.S. PATENT DOCUMENTS

| | | | | |
|---|---|---|---|---|
| 4,661,216 A | * | 4/1987 | Anderson et al. ........... | 205/260 |
| 5,011,581 A | * | 4/1991 | Omata ........................ | 205/184 |
| 6,132,892 A | * | 10/2000 | Yoshikawa et al. ......... | 428/812 |
| 6,346,181 B1 | * | 2/2002 | Lee et al. ..................... | 205/89 |

OTHER PUBLICATIONS tai-Ping Sun et al, "Plating with Pulsed and Periodic-Reverse Current", Metal Finishing, May 1979, pp. 33-38.*
Frederick A. Lowenheim, Electroplating, McGraw-Hill Book Co., New York, 1978, pp. 376-377.*

* cited by examiner

*Primary Examiner*—Roy King
*Assistant Examiner*—William T. Leader
(74) *Attorney, Agent, or Firm*—Brinks Hofer Gilson & Lione

(57) ABSTRACT

A lower magnetic pole layer and/or an upper magnetic pole layer are formed of a CoFeα alloy in which the component ratio X of Co is 8 to 48 mass %, the component ratio Y of Fe is 50 to 90 mass %, the component ratio Z of the element α (the element α is at least one of Ni and Cr) is 2 to 20 mass %, and the equation X+Y+Z=100 mass % is satisfied. Consequently, the saturated magnetic flux density can be 2.0 T or more, and a thin-film magnetic head have a higher recording density can be manufactured

9 Claims, 9 Drawing Sheets

SOFT MAGNETIC FILM HAVING IMPROVED SATURATED MAGNETIC FLUX DENSITY, MAGNETIC HEAD USING THE SAME, AND MANUFACTURING METHOD THEREFORE

This application is a divisional of Ser. No.: 10/042,085, filed on Jan. 8, 2002, now U.S. Pat. No. 6,714,380, issued on Mar. 30, 2004, which claims priority to Japanese patent application 2001-005906, filed Jan. 15, 2001, all of which are incorporated herein by reference.

BACKGROUND OF THE INVENTION

1. Field of the Invention

The present invention relates to soft magnetic films which contain a CoFe$\alpha$ alloy (the element $\alpha$ is Ni or the like) used as, for example, core materials of thin-film magnetic heads and which have superior corrosion resistance and a higher saturated magnetic flux density Bs than an NiFe alloy. In addition, the present invention relates to thin-film magnetic heads using the soft magnetic films described above, to methods for manufacturing the soft magnetic films, and to methods for manufacturing the thin-film magnetic heads.

2. Description of the Related Art

In particular, concomitant with the recent trend toward higher recording densities, it has become necessary that, in order to improve a recording density, a magnetic material having a higher saturated magnetic flux density Bs be used for forming a core layer of a thin-film magnetic head so that a magnetic flux is concentrated in the vicinity of the gap of the core layer.

An NiFe alloy has been frequently used for the magnetic material described above. The NiFe alloy described above is formed by an electroplating method using a DC current and is able to have a saturated magnetic flux density Bs of approximately 1.8 T.

In order to further increase the saturated magnetic flux density Bs of the NiFe alloy, for example, an electroplating method using a pulse current is used in place of an electroplating method using a DC current.

According to the method described above, the Bs of the NiFe alloy can be increased; however, the saturated magnetic flux density Bs cannot be increased to 2.0 T or more. In addition, the surface roughness of the film is increased, and hence, there has been a problem in that the NiFe alloy is corroded by various solvents used in a process for forming a thin-film magnetic head.

From the NiFe alloy described above, a soft magnetic film having a high saturated magnetic flux density Bs together with superior corrosion resistance has not been formed.

In addition to the NiFe alloy, as a soft magnetic material which is frequently used, a CoFe alloy film may be mentioned. When the component ratio of Fe is appropriately controlled, the CoFe alloy film may have a higher saturated magnetic flux density Bs than that of an NiFe alloy film; however, it has the following problem.

Depending on the structure of a thin-film magnetic head or another magnetic element, an NiFe alloy may be overlaid on the CoFe alloy in some cases. In the case described above, when the NiFe alloy film is formed on the CoFe alloy film by an electroplating method, the CoFe alloy film may be ionized and dissolved out, and as a result, corrosion occurs.

The reason for this is that a significant potential difference (difference in standard electrode potential) is generated between the CoFe alloy film and the NiFe alloy film, and it is believed that a so-called battery effect is obtained by this potential difference and that the CoFe alloy film is dissolved out.

In addition to the NiFe alloy film and the CoFe alloy film described above, a CoFeNi film is also one of the soft magnetic films which are frequently used. For example, in Table 2 shown in U.S. Pat. No. 6,063,512, four CoFeNi alloy films having different compositions and soft magnetic properties thereof are listed.

However, according to the compositions of the CoFeNi alloy films described in this publication, the saturated magnetic flux densities Bs thereof are all less than 2.0 T, and compared to a NiFe alloy film, a large saturated magnetic flux density Bs cannot be effectively obtained.

SUMMARY OF THE INVENTION

Accordingly, the present invention was made to solve the conventional problems described above, and an object of the present invention is to provide a soft magnetic film having a higher saturated magnetic flux density Bs than that of an NiFe alloy and superior corrosion resistance, the soft magnetic film containing a CoFe$\alpha$ alloy having appropriate component ratios; a thin-film magnetic head using the soft magnetic film described above; a method for manufacturing the soft magnetic film; and a method for manufacturing the thin-film magnetic head.

In addition, the present invention also provides a soft magnetic film which comprises a CoFe$\alpha$ alloy and which can maintain a high saturated magnetic flux density Bs, in which the CoFe$\alpha$ alloy is prevented from being dissolved out when an NiFe alloy is formed thereon by plating; a thin-film magnetic head using the soft magnetic film described above; a method for manufacturing the soft magnetic film; and a method for manufacturing the thin-film magnetic head.

In accordance with one aspect of the present invention, a soft magnetic film has a composition represented by the formula $Co_xFe_y\alpha_z$ (the element $\alpha$ is at least one of Ni and Cr), wherein the component ratio X of Co is 8 to 48 mass %, the component ratio Y of Fe is 50 to 90 mass %, the component ratio Z of the element $\alpha$ is 2 to 20 mass %, and the equation X+Y+Z=100 mass % is satisfied.

When a CoFe$\alpha$ alloy has the composition described above, the saturated magnetic flux density Bs thereof can be 2.0 T or more. As described above, in the present invention, a higher saturated magnetic flux density Bs than that of an NiFe alloy can be obtained.

In addition, the formation of coarse crystal grains can be suppressed, dense crystals can be formed, and hence, the surface roughness can be decreased. Accordingly, in the present invention, a soft magnetic film having a high saturated magnetic flux density Bs of 2.0 T or more and, in addition, superior corrosion resistance can be manufactured.

In the present invention, it is preferable that the component ratio X of Co be 23 to 32 mass %, the component ratio Y of Fe be 58 to 71 mass %, the component ratio Z of the element $\alpha$ be 2 to 20 mass %, and the equation X+Y+Z=100 mass % be satisfied.

When a CoFe$\alpha$ alloy has the component ratios in the ranges described above, the saturated magnetic flux density Bs thereof can be 2.15 T or more. In addition, the center line average roughness Ra of the film surface can be 5 nm or less, and the corrosion resistance can be more effectively improved.

In addition, in the present invention, it is more preferable that the component ratio X of Co be 23.3 to 28.3 mass %, the component ratio Y of Fe be 63 to 67.5 mass %, the component ratio Z of the element α be 4.2 to 13.6 mass %, and the equation X+Y+Z=100 mass % be satisfied. Consequently, the saturated magnetic flux density Bs can be 2.2 T or more. In addition, the center line average roughness Ra of the film surface can be 5 nm or less, and the corrosion resistance can be more effectively improved.

Furthermore, in the present invention, it is most preferable that the component ratios, X of Co, Y of Fe, and Z of the element α, be in the area surrounded by three points (X, Y, and Z) of (26.5, 64.6, and 8.9 mass %), (25.5, 63, and 11.5 mass %), and (23.3, 67.5, and 9.2 mass %), and the component ratios satisfy the equation X+Y+Z=100 mass %. Consequently, the saturated magnetic flux density Bs can be more than 2.2 T. In particular, it was confirmed by the experiments described below that the saturated magnetic flux density Bs could be increased up to 2.25 T. In addition, the center line average roughness Ra of the film surface can be 5 nm or less, and the corrosion resistance can be more effectively improved.

In the present invention, a passivation film is preferably formed on a surface of the soft magnetic film. The passivation film is a dense oxide film and is formed by the presence of Ni or Cr in the soft magnetic film.

In the case in which the passivation film is formed on the surface of the soft magnetic film as described above, the CoFeα alloy can be prevented from being ionized and dissolved out even when an NiFe alloy film is formed on the soft magnetic film by plating.

Accordingly, in the present invention, even when an NiFe alloy film is formed on the CoFeα alloy film by plating, a high saturated magnetic flux density Bs and superior corrosion resistance of the CoFeα alloy can be appropriately maintained.

In the present invention, the soft magnetic film is preferably formed by plating. Consequently, a soft magnetic film having an optional thickness can be formed, and a film thickness larger than that formed by sputtering can be obtained.

A thin-film magnetic head in accordance with another aspect of the present invention comprises a lower core layer composed of a magnetic material, an upper core layer formed above the lower core layer with a magnetic gap provided therebetween, and a coil layer for supplying a recording magnetic field to the lower core layer and the upper core layer described above, wherein at least one of the lower core layer and the upper core layer is formed of the soft magnetic film described above.

In addition, the thin-film magnetic head described above may further comprise a bulged lower magnetic pole layer formed on the lower core layer so as to be exposed to an opposing surface opposing a recording medium, and the lower magnetic pole layer is preferably formed of the soft magnetic film described above.

A thin-film magnetic head in accordance with another aspect of the present invention comprises a lower core layer, an upper core layer, and a magnetic pole portion provided between the lower core layer and the upper core layer, the width in the track width direction of the magnetic pole portion being formed smaller than that of each of the lower core layer and the upper core layer, wherein the magnetic pole portion comprises a lower magnetic pole layer in contact with the lower core layer, an upper magnetic pole layer in contact with the upper core layer, and a gap layer provided between the lower magnetic pole layer and the upper magnetic pole layer, or the magnetic pole portion comprises an upper magnetic pole layer in contact with the upper core layer and a gap layer provided between the upper magnetic pole layer and the lower core layer, and at least one of the upper magnetic pole layer and the lower magnetic pole layer is formed of the soft magnetic film described above.

In the thin-film magnetic head described above, it is preferable that the upper magnetic pole layer described above be formed of the soft magnetic film and that the upper core layer provided on the upper magnetic pole layer be an NiFe alloy film formed by plating.

In addition, in the present invention, it is preferable that at least one of the upper core layer and the lower core layer have a portion which is in contact with the magnetic gap and which is composed of at least two magnetic layers, or that at least one of the upper magnetic pole layer and the lower magnetic pole layer be composed of at least two magnetic layers, in which a magnetic layer in contact with the magnetic gap among the magnetic layers is formed of the soft magnetic film.

In the case described above, the magnetic layers other than the magnetic layer in contact with the magnetic gap layer are preferably composed of an NiFe alloy formed by plating.

As described above, the CoFeα alloy of the present invention used as a soft magnetic film has a high saturated magnetic flux density Bs of 2.0 T or more, and the surface roughness is small. When this type of soft magnetic film is used for a core material of a thin-film magnetic head, the magnetic flux can be concentrated in the vicinity of the gap, the trend toward higher recording densities can be facilitated, and hence, a thin-film magnetic head having superior corrosion resistance can be manufactured.

In accordance with another aspect of the present invention, a method for manufacturing a soft magnetic film comprises a step of forming a $Co_xFe_y\alpha_z$ alloy film by electroplating in a plating solution using a pulse current, wherein the component ratio X of Co is 8 to 48 mass %, the component ratio Y of Fe is 50 to 90 mass %, the component ratio Z of the element α (the element α is at least one of Ni and Cr) is 2 to 20 mass %, and the equation X+Y+Z=100 mass % is satisfied.

The Fe content has a significant influence on the saturated magnetic flux density Bs. When the Fe content is small, the Bs is decreased. According to a CoFeNi alloy shown in Table 2 in U.S. Pat. No. 6,063,512, the Fe content is up to 30 mass %, and it is believed that a low Fe content as described above may be one reason responsible for decreasing the saturated magnetic flux density Bs to less than 2.0 T.

In addition, by a conventional electroplating method using a DC current, it has been difficult to increase the Fe content. In order to increase the Fe content in a film, for example, the Fe ion concentration in a plating solution was increased; however, there had been a limitation, and a CoFeNi alloy having a saturated magnetic flux density Bs of 2.0 T or more could not be obtained.

Accordingly, in the present invention, the CoFeα alloy is formed by electroplating using a pulse current. In the electroplating using a pulse current, for example, on and off operations of a current controlling element are repeatedly performed so that there are periods in which a current flows and periods in which current does not flow during plating. Since there are periods in which current does not flow, a CoFeα alloy film is gradually formed by plating, and the deviation of current density distribution during plating can be reduced compared to that of a conventional electroplating method using a DC current. According to the electroplating using a pulse current, the Fe content in the soft magnetic film can be easily controlled compared to that of the electroplating using a DC current, and hence, the Fe content in the film can be increased.

According to the present invention, the component ratio Y of Fe can be 50 to 90 mass %. According to the component ratio mentioned above, it was found by the experiments described later that the saturated magnetic flux density Bs could be 2.0 T or more. Concerning the component ratios of Co and the element α, when the element α is excessively contained, it was found by the experiments described later that the saturated magnetic flux density Bs was decreased to less than 2.0 T. According to the present invention, when the component ratio X of Co is set to 8 to 48 mass %, and the component ratio Z of the element α is set to 2 to 20 mass%, a CoFeα alloy having a saturated magnetic flux density Bs of 2.0 T or more and superior corrosion resistance can be manufactured.

According to the present invention, the plating is preferably performed in a plating solution having a ratio of Fe ion concentration to Co ion concentration of 1.5 or more and a ratio of Fe ion concentration to α ion concentration of 2 to 4, whereby a $Co_xFe_yα_z$ alloy film is formed in which the component ratio X of Co is 23 to 32 mass %, the component ratio Y of Fe is 58 to 71 mass %, the component ratio Z of the element α is 2 to 20 mass %, and the equation X+Y+Z=100 mass % is satisfied.

As shown in the experiments described later, in the CoFeα alloy formed in the plating solution having the ratios of ion concentration described above, the saturated magnetic flux density Bs can be 2.15 T or more, the center line average roughness of the film surface can be 5 nm or less, and hence, a soft magnetic film having a high saturated magnetic flux density Bs and superior corrosion resistance can be manufactured by plating.

According to the present invention, the plating is more preferably performed in a plating solution having a ratio of Fe ion concentration to Co ion concentration of 1.5 or more and a ratio of Fe ion concentration to α ion concentration of 2 to 3.4, whereby a $Co_xFe_yα_z$ alloy film is formed in which the component ratio X of Co is 23.3 to 28.3 mass %, the component ratio Y of Fe is 63 to 67.5 mass %, the component ratio Z of the element α is 4.2 to 13.6 mass %, and the equation X+Y+Z=100 mass % is satisfied. As shown in the experiments described later, in the CoFeα alloy formed in the plating solution having the ratios of ion concentration described above, the saturated magnetic flux density Bs can be 2.2 T or more.

According to the present invention, the plating is most preferably performed in a plating solution having a ratio of Fe ion concentration to Co ion concentration of 1.7 or more and a ratio of Fe ion concentration to α ion concentration of 2 to 3.4, whereby a $Co_xFe_yα_z$ alloy film is formed in which the component ratios, X of Co, Y of Fe, and Z of the element α, are in the area surrounded by three points (X, Y, and Z) of (26.5, 64.6, and 8.9 mass %), (25.5, 63, and 11.5 mass %), and (23.3, 67.5, and 9.2 mass %), and the equation X+Y+Z=100 mass % is satisfied. As shown in the experiments described later, in the CoFeα alloy formed in the plating solution having the ratios of ion concentration described above, the saturated magnetic flux density Bs can be more than 2.2 T.

In the present invention, the plating solution preferably contains sodium saccharin. Sodium saccharin ($C_6H_4CONNaSO_2$) serves as a stress relaxation agent; hence, when the sodium saccharin is contained, the film stress of the CoFeα alloy can be reduced.

In the present invention, the plating solution preferably contains 2-butyne-1,4-diol. Accordingly, the formation of coarse crystal grains of the CoFeα alloy formed by plating is suppressed, the particle diameter of the crystal grains is decreased, and it is unlikely that voids would be generated between the crystals, whereby the surface roughness of the film is decreased. Since the surface roughness can be decreased, the coercive force Hc can also be decreased.

In the present invention, the plating solution preferably contains sodium 2-ethylhexyl sulfate. Accordingly, since hydrogen generated in the plating solution is removed by the sodium 2-ethylhexyl sulfate which serves as a surfactant, the surface roughness caused by the adsorption of the hydrogen to the plating film can be suppressed.

In addition, in place of the sodium 2-ethylhexyl sulfate, sodium lauryl sulfate may be used. However, when sodium 2-ethylhexyl sulfate is contained in a plating solution, the generation of bubbles is not significant compared to the case of using sodium lauryl sulfate, and a larger amount of sodium 2-ethylhexyl sulfate can be contained in the plating solution, whereby the hydrogen can be appropriately removed.

In accordance with another aspect of the present invention, a method for manufacturing a thin-film magnetic head, which includes a lower core layer composed of a magnetic material, an upper core layer opposing the lower core layer at an opposing surface opposing a recording medium with a magnetic gap provided therebetween, and a coil layer supplying a recording magnetic field to the two core layers described above, comprises a step of forming at least one of the lower core layer and the upper core layer composed of a soft magnetic film by plating in accordance with the manufacturing method described above.

The method described above may further comprise a step of forming a bulged lower magnetic pole layer on the lower core layer so as to be exposed to the opposing surface opposing the recording media, wherein the bulged lower magnetic pole layer is preferably formed of the soft magnetic film by plating.

In accordance with another aspect of the present invention, a method for manufacturing a thin-film magnetic head, which includes a lower core layer, an upper core layer, and a magnetic pole portion which is provided between the lower core layer and the upper core layer and which has the width in the track width direction formed smaller than that of each of the lower core layer and the upper core layer, comprises a step of forming a lower magnetic pole layer in contact with the lower core layer, an upper magnetic pole layer in contact with the upper core layer, and a gap layer provided between the lower magnetic pole layer and the upper magnetic pole layer so as to form the magnetic pole portion; or a step of forming an upper magnetic pole layer in contact with the upper core layer and a gap layer provided between the upper magnetic pole layer and the lower core layer so as to form the magnetic pole portion, wherein at least one of the upper magnetic pole layer and the lower magnetic pole layer is formed of the soft magnetic film by plating according to the manufacturing method described above.

In the method described above, it is preferable that the upper magnetic pole layer be formed of the soft magnetic film by plating and that the upper core layer be formed of an NiFe alloy film by electroplating on the upper magnetic pole layer.

In the method described above, it is preferable that at least one of the upper core layer and the lower core layer have a portion which is in contact with the magnetic gap and which is composed of at least two magnetic layers, or that at least one of the upper magnetic pole layer and the lower magnetic pole layer be composed of at least two magnetic layers, in which a magnetic layer in contact with the magnetic gap among the magnetic layers is formed of the soft magnetic film described above.

In the present invention, the magnetic layers other than the magnetic layer in contact with the magnetic gap layer are preferably formed of an NiFe alloy by electroplating.

As described above, when the CoFeα alloy used as the soft magnetic film of the present invention is formed by electroplating using a pulse current, a $Co_xFe_yc\alpha_z$ alloy can be formed in which the component ratio X of Co is of 8 to 48 mass %, the component ratio Y of Fe is 50 to 90 mass %, the component ratio Z of the element α is 2 to 20 mass % (the element α is at least one of Ni and Cr), and the equation X+Y+Z=100 mass % is satisfied.

In addition, when the soft magnetic film described above is used as a core material of a thin-film magnetic head, the saturated magnetic flux density Bs can be increased, and hence, a higher recording density can be achieved. In addition, a thin-film magnetic head having superior corrosion resistance can be manufactured in a high yield.

DESCRIPTION OF THE PREFERRED EMBODIMENTS

Figure 1:
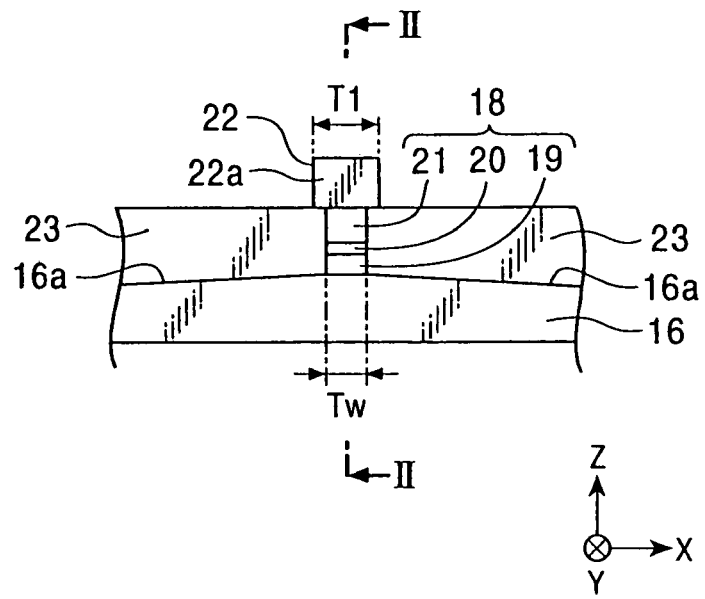
FIG. 1 is a partial front view of a thin-film magnetic head of a first embodiment according to the present invention.
Figure 2:
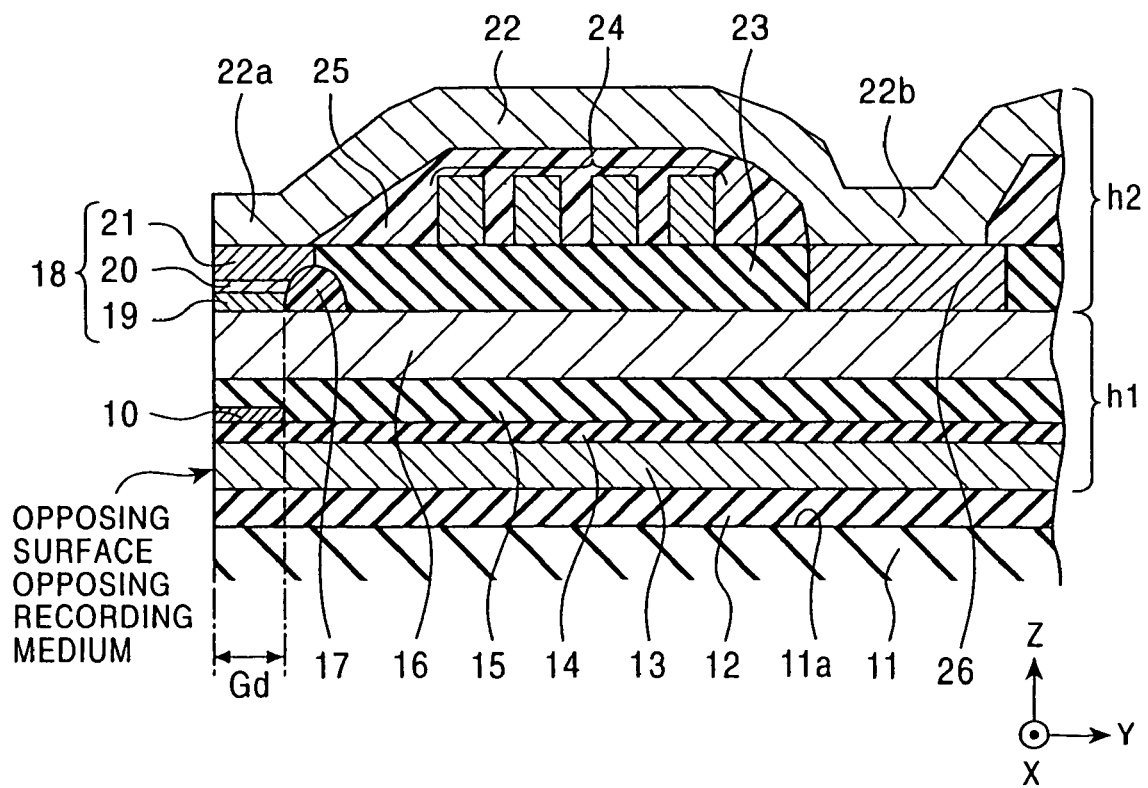
FIG. 2 is a longitudinal cross-sectional view of the thin-film magnetic head shown in FIG. 1.

FIG. 1 is a partial front view of a thin-film magnetic head of a first embodiment of the present invention, and FIG. 2 is a longitudinal cross-sectional view of the thin-film magnetic head taken along the line II—II in FIG. 1 and viewed in the direction along the arrow.

The thin-film magnetic head of the present invention is formed on a trailing side surface 11a of a slider 11, which is formed of a ceramic material and constitutes a floating head, and is an MR/inductive composite thin-film magnetic head (hereinafter simply referred to as "thin-film magnetic head") composed of an MR head h1 and a writing inductive head h2 laminated to each other.

The MR head h1 senses a leakage magnetic field from a recording medium such as a hard disc by using the magnetoresistance and reads a recorded signal.

As shown in FIG. 2, above the trailing side surface 11a of the slider 11, a lower shield layer 13 composed of a magnetic material such as NiFe is formed with an $Al_2O_3$ film 12 provided therebetween, and a lower gap layer 14 composed of an insulating material is formed on the lower shield layer 13.

On the lower gap layer 14, a magnetoresistive element 10, such as an anisotropic magnetoresistive (AMR) element, a giant magnetoresistive (GMR) element, or a tunnel type magnetoresistive (TMR) element is formed in the height direction (Y direction in the figure) from an opposing surface opposing the recording medium, and in addition, on the magnetoresistive element 10 and the lower gap layer 14, an upper gap layer 15 composed of an insulating material is formed. Furthermore, on the upper gap layer 15, an upper shield layer 16 composed of a magnetic material such as NiFe is formed. The MR head h1 is a laminate formed of the lower shield layer 13 to the upper shield layer 16 described above.

In the embodiment shown in FIGS. 1 and 2, the upper shield layer 16 is also used as a lower core layer of the inductive head h2, and a gap depth (Gd) determining layer 17 is formed on the lower core layer 16, whereby the GD is determined by the distance from the opposing surface opposing the recording medium to the front portion of the Gd determining layer 17. The Gd determining layer 17 is formed of, for example, an organic insulating material.

In addition, as shown in FIG. 1, the upper surface 16a of the core layer 16 is gradually inclined downward in the track width direction (X direction in the figure) from a base portion of a magnetic pole portion 18, and as a result, the generation of side fringing can be suppressed.

In addition, as shown in FIG. 2, the magnetic pole portion 18 is formed from the opposing surface opposing the recording medium to the Gd determining layer 17.

The magnetic pole portion 18 is a laminate of a lower magnetic pole layer 19, a nonmagnetic gap layer 20, and an upper magnetic pole layer 21 formed in that order from the bottom.

The lower magnetic pole layer 19 is directly formed on the lower core layer 16 by plating. In addition, the gap layer 20 provided on the lower magnetic pole layer 19 is preferably formed of a nonmagnetic metal material which can be plated. In particular, the above-mentioned material is preferably at least one selected from the group consisting of NiP, NiPd, NiW, NiMo, Au, Pt, Rh, Pd, Ru, and Cr.

As a particular embodiment of the present invention, Nip is used for the gap layer 20. When the gap layer 20 is formed of NiP, the gap layer 20 can be appropriately placed in a nonmagnetic state.

In addition, the upper magnetic pole layer 21 formed on the gap layer 20 is magnetically coupled with an upper core layer 22 formed on the upper magnetic pole layer 21.

When the gap layer 20 is formed of the nonmagnetic metal material which can be plated, the lower magnetic pole layer 19, the gap layer 20, and the upper magnetic pole layer 21 can be continuously formed by plating.

The magnetic pole portion 18 may be formed of two layers, that is, may be formed of the gap layer 20 and the upper magnetic pole layer 21.

As shown in FIG. 1, the width of the magnetic pole portion 18 in the track width direction (X direction in the figure) is formed so as to be equivalent to the track width Tw.

As shown in FIGS. 1 and 2, an insulating layer 23 is formed on both sides of the magnetic pole portion 18 in the track width directions (X direction in the figure) and on the rear side thereof in the height direction (Y direction in the figure). The upper surface of the insulating layer 23 is formed to be flush with the upper surface of the magnetic pole portion 18.

As shown in FIG. 2, a coil layer 24 in a spiral pattern is formed on the insulating layer 23. In addition, the coil layer 24 is covered by an organic insulating layer 25.

As shown in FIG. 2, a patterned upper core layer 22 is formed on the magnetic pole portion 18 and the insulating layer 25 by flame plating or the like. As shown in FIG. 1, a front portion 22a of the upper core layer 22 has a width of T1 in the track width direction at the opposing surface opposing the recording medium, and this width T1 is formed larger than the track width Tw.

In addition, as shown in FIG. 2, a base portion 22b of the upper core layer 22 is directly connected to a magnetic connecting layer (back gap layer) 26 formed on the lower core layer 16.

In the present invention, the upper magnetic pole layer 21 and/or the lower magnetic pole layer 19 are formed of a soft magnetic film having the composition described below.

The composition is represented by the formula $Co_xFe_y\alpha_z$ (the element $\alpha$ is at least one of Ni and Cr) in which the component ratio X of Co is 8 to 48 mass %, the component ratio Y of Fe is 50 to 90 mass %, the component ratio Z of the element $\alpha$ is 2 to 20 mass %, and the formula X+Y+Z=100 mass % is satisfied.

The saturated magnetic flux density Bs can be increased with an increase in the Fe content. However, when the Fe content is too much increased, the surface roughness of the film is significantly increased due to the formation of coarser crystal grains. As a result, the corrosion resistance is decreased, and the saturated magnetic flux density Bs is simultaneously decreased.

According to the present invention, by controlling the Fe content in the range of 50 to 90 mass %, a saturated magnetic flux density of 2.0 T or more can be obtained.

Concerning the component ratios of Co and the element $\alpha$ of the formula $Co_xFe_y\alpha_z$, since a higher saturated magnetic flux density BS can be obtained by adding Co than that of permalloy which is only composed of Ni and Fe, an appropriate amount of Co must be added. On the other hand, when the element $\alpha$ is added, the saturated magnetic flux density Bs is decreased compared to that of a magnetic material only composed of Co and Fe, and hence, the element $\alpha$ must be added so that the saturated magnetic flux density Bs is not decreased to less than 2.0 T. According to the experiments described later, it was found that when the content of the element $\alpha$ was more than 20 mass %, the saturated magnetic flux density Bs was decreased to less than 2.0 T.

In view of the component ratios described above, the component ratios, X of Co, Y of Fe, and Z of the element $\alpha$, are set to 8 to 48 mass %, 50 to 90 mass %, and 2 to 20 mass %, respectively. Consequently, the saturated magnetic flux density Bs can be 2.0 T or more. In addition, in the present invention, a high saturated magnetic flux density can be reliably obtained.

In addition, since the crystals are densely formed, the surface roughness of the film can be decreased, the corrosion resistance can be improved, and in addition, the coercive force Hc can be decreased. In particular, the coercive force can be decreased to 1,580 A/m or less.

When a CoFe$\alpha$ alloy has the composition described above, a resistivity of 15 $\mu\Omega\cdot$cm or more can be obtained. In addition, the film stress can be decreased to 400 MPa or less. Furthermore, an anisotropic magnetic field Hk approximately equivalent to that of an NiFe alloy, which has been generally used as a soft magnetic material, can be obtained.

In the present invention, it is preferable that the component ratio X of Co be 23 to 32 mass %, the component ratio Y of Fe be 58 to 71 mass %, the component ratio Z of the element $\alpha$ be 2 to 20 mass %, and the component ratios satisfy the equation X+Y+Z=100 mass %.

As a result, the saturated magnetic flux density Bs can be further increased, and in particular, a saturated magnetic flux density Bs of 2.15 T or more can be obtained. In addition, the center line average roughness Ra of the film surface can reliably be 5 nm or less. Accordingly, a soft magnetic film having a high saturated magnetic flux density Bs and superior corrosion resistance can be effectively manufactured.

In the present invention, it is more preferable that the component ratio X of Co be 23.3 to 28.3 mass %, the component ratio Y of Fe be 63 to 67.5 mass %, the component ratio Z of the element $\alpha$ be 4.2 to 13.6 mass %, and the equation X+Y+Z=100 mass % be satisfied. Consequently, a saturated magnetic flux density Bs of 2.2 T or more can be obtained. In addition, the center line average roughness Ra of the film surface can reliably be 5 nm or less.

In the present invention, it is most preferable that the component ratios, X of Co, Y of Fe, and Z of the element $\alpha$, be in the area surrounded by three points (X, Y, and Z) of (26.5, 64.6, and 8.9 mass %), (25.5, 63, and 11.5 mass %), and (23.3, 67.5, and 9.2 mass), and the equation X+Y+Z=100 mass % be satisfied. Consequently, the saturated magnetic flux density Bs can be increased to more than 2.2 T. In addition, the center line average roughness Ra of the film surface can reliably be 5 nm or less. For example, it was verified that when the component ratios of Fe, Co, and the element $\alpha$ were 66.1 mass %, 24.6 mass %, and 9.3 mass %, respectively, the saturated magnetic flux density Bs could be 2.25 T.

As the element $\alpha$, Ni is preferably used. That is, the upper magnetic pole layer 21 and/or the lower magnetic pole layer 19 are preferably formed of a CoFeNi alloy. When a CoFeNi alloy having the composition described above is formed, the saturated magnetic flux density Bs can reliably be 2.0 T or more. In addition, by the presence of Ni, the film stress can particularly be decreased.

As described above, in the present invention, since the CoFe$\alpha$ alloy described above can have a high saturated magnetic flux density of 2.0 T or more, when the upper magnetic pole layer 21 and/or the lower magnetic pole layer 19 are formed of the CoFe$\alpha$ alloy, the magnetic flux can be concentrated in the vicinity of the gap of the magnetic pole layers, and hence, the recording density can be increased. Accordingly, a thin-film magnetic head which can meet the requirement of even higher recording density can be manufactured. Furthermore, the CoFe$\alpha$ alloy having the composition described above has small surface roughness, superior corrosion resistance, and a low coercive force Hc.

Figure 3:
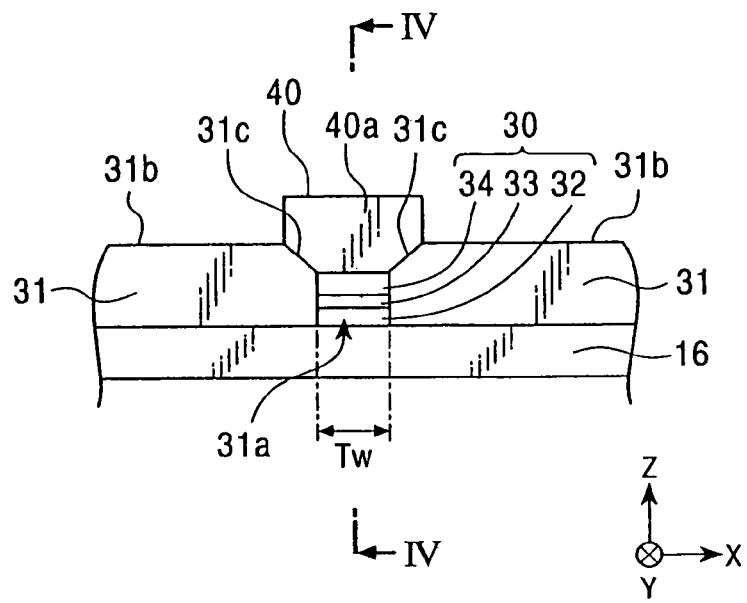
FIG. 3 is a partial front view of a thin-film magnetic head of a second embodiment according to the present invention.
Figure 4:
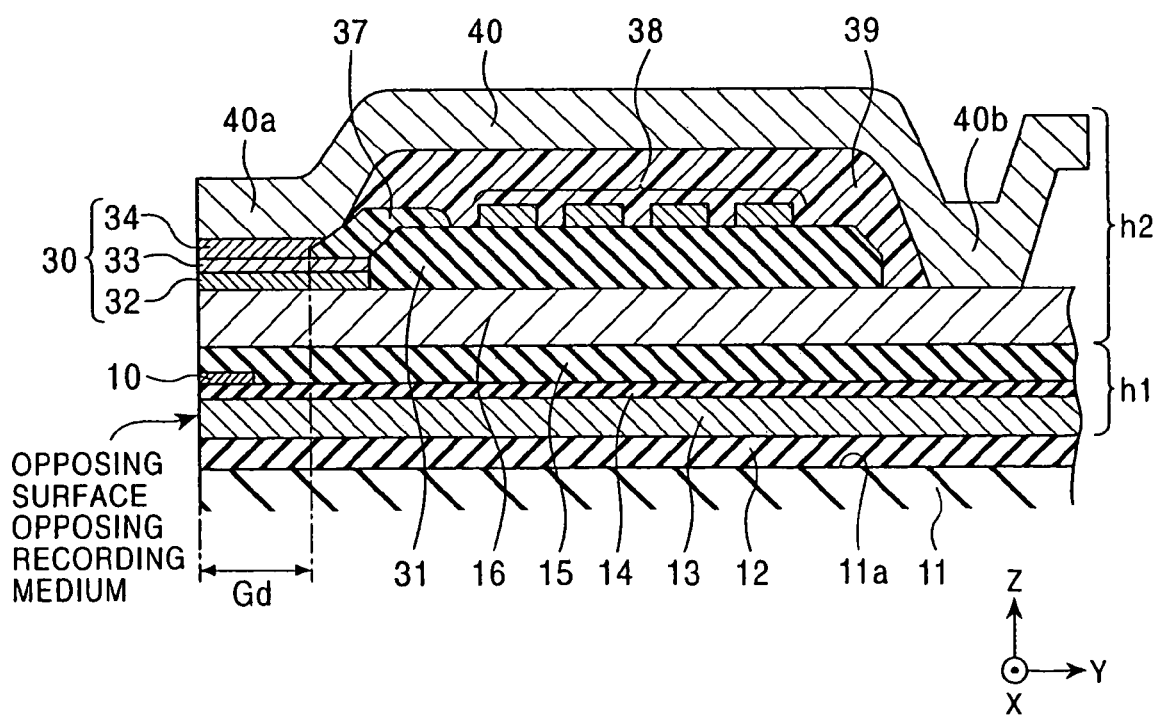
FIG. 4 is a longitudinal cross-sectional view of the thin-film magnetic head shown in FIG. 3.

FIG. 3 is a partial front view showing the structure of a thin-film magnetic head of a second embodiment of the present invention, and FIG. 4 is a longitudinal cross-sectional view of the thin-film magnetic head taken along the line IV—IV shown in FIG. 3 and viewed in the direction along the arrow.

In this embodiment, the structure of the MR head h1 is the same as that shown in FIG. 1 or 2.

As shown in FIG. 3, an insulating layer 31 is formed on the lower core layer 16. A groove 31a, which has a predetermined length, for forming a track width is formed in the insulating layer 31 in the height direction (Y direction in the figure) from the opposing surface opposing the recording medium. The groove 31a for forming the track width is formed so as to have the track width Tw at the opposing surface opposing the recording medium (see FIG. 3).

In the groove 31a for forming the track width, a magnetic pole portion 30 is formed of a lower magnetic pole layer 32, a nonmagnetic gap layer 33, and an upper magnetic pole layer 34 laminated to each other in that order from the bottom.

The lower magnetic pole layer 32 is formed directly on the lower core layer 16 by plating. The gap layer 33 provided on the lower magnetic pole layer 32 is preferably formed of a nonmagnetic metal material which can be plated. In particular, the nonmagnetic metal material is preferably at least one selected from the group consisting of NiP, NiPd, NiW, NiMo, Au, Pt, Rh, Pd, Ru, and Cr.

As a particular embodiment of the present invention, the gap layer 33 is formed of NiP. The reason the gap layer 33 is formed of NiP is that the gap layer 33 can be appropriately placed in a nonmagnetic state.

The magnetic pole portion 30 may be formed of two layers, that is, the gap layer 33 and the upper magnetic pole layer 34.

A Gd determining layer 37 is formed on the insulating layer 31 at a distance of the gap depth (Gd) from the opposing surface opposing the recording medium.

In addition, the upper magnetic pole layer 34 formed on the gap layer 33 is magnetically coupled with an upper core layer 40 formed on the upper magnetic pole layer 34.

When the gap layer 33 is formed of the nonmagnetic metal material which can be plated as described above, the lower magnetic pole layer 32, the gap layer 33, and the upper magnetic pole layer 34 can be continuously formed by plating.

As shown in FIG. 4, a coil layer 38 in a spiral pattern is formed on the insulating layer 31. In addition, the coil layer 38 is covered by an insulating layer 39 composed of an organic insulating material or the like.

As shown in FIG. 3, on both side surfaces in the track width direction (X direction shown in the figure) of the groove 31a for forming the track width, inclined surfaces 31c are formed from the upper surface of the upper magnetic pole layer 34 to the upper surface 31b of the insulating layer 31, in which the width between the inclined surfaces 31c is gradually increased in the direction opposite to the lower core layer 16.

In addition, as shown in FIG. 3, a front portion 40a of the upper core layer 40 is formed on the inclined surfaces 31c from the upper surface of the upper magnetic pole layer 34 in the direction opposite to the lower core layer 16.

As shown in FIG. 4, the upper core layer 40 is formed on the insulating layer 39 from the opposing surface opposing the recording medium in the height direction (Y direction in the figure), and a base portion 40b of the upper core layer 40 is directly formed on the lower core layer 16.

In the second embodiment shown in FIGS. 3 and 4, the lower magnetic pole layer 32 and/or the upper magnetic pole layer 34 are formed of an alloy represented by the formula $Co_xFe_y\alpha_z$ in which the component ratio X of Co is 8 to 48 mass %, the component ratio Y of Fe is 50 to 90 mass %, the component ratio Z of the element $\alpha$ (the element $\alpha$ is at least one of Ni and Cr) is 2 to 20 mass %, and the equation X+Y+Z=100 mass % is satisfied.

In the present invention, it is preferable that the component ratio X of Co be 23 to 32 mass %, the component ratio Y of Fe be 58 to 71 mass %, the component ratio Z of the element $\alpha$ be 2 to 20 mass %, and the component ratios satisfy the equation X+Y+Z=100 mass %.

In addition, in the present invention, it is more preferable that the component ratio X of Co be 23.3 to 28.3 mass %, the component ratio Y of Fe be 63 to 67.5 mass %, the component ratio Z of the element $\alpha$ be 4.2 to 13.6 mass %, and the component ratios satisfy the equation X+Y+Z=100 mass %.

Furthermore, in the present invention, it is most preferable that the component ratios, X of Co, Y of Fe, and Z of the element $\alpha$, be in the area surrounded by three points (X, Y, and Z) of (26.5, 64.6, and 8.9 mass %), (25.5, 63, and 11.5 mass %), and (23.3, 67.5, and 9.2 mass), and the component ratios satisfy the equation X+Y+Z=100 mass %.

Since the lower magnetic pole layer 32 and the upper magnetic pole layer 34 are formed of the CoFe$\alpha$ alloy described above having a saturated magnetic flux density Bs of 2.0 T or more, the magnetic flux can be concentrated in the vicinity of the gap, and the recording density can be increased, whereby a thin-film magnetic head having a higher recording density can be manufactured. The saturated magnetic flux density Bs described above is more preferably 2.2 T or more.

In addition, since the CoFe$\alpha$ alloy having the composition described above has crystals which are densely formed, the surface roughness of the film can be decreased, and the corrosion resistance can be improved. In the present invention, the center line average roughness Ra of the film surface can be 5 nm or less. In addition, the coercive force Hc can be decreased to 1,580 A/m or less.

In the embodiments shown in FIGS. 1 to 4, the magnetic pole portion 18 is formed between the lower core layer 16 and the upper core layer 22, the magnetic pole portion 30 is formed between the lower core layer 16 and the upper core layer 40, and the lower magnetic pole layers 19 and 32 and/or the upper magnetic pole layers 21 and 34, which form the magnetic pole portions 18 and 30 as described above, are formed of an alloy represented by the formula $Co_xFe_y\alpha_z$. In the alloy represented by the formula $Co_xFe_y\alpha_z$, the component ratio X of Co is 8 to 48 mass %, the component ratio Y of Fe is 50 to 90 mass %, the component ratio Z of the element $\alpha$ (the element $\alpha$ is at least one of Ni and Cr) is 2 to 20 mass %, and the equation X+Y+Z=100 mass % is satisfied. In particular, in the present invention, it is preferable that the upper magnetic pole layers 21 and 34 be formed of the $Co_xFe_y\alpha_z$ alloy and that the upper core layers 22 and 40 be formed of an NiFe alloy by plating on the upper magnetic pole layers 21 and 34, respectively.

The upper core layers 22 and 40 each preferably have a higher resistivity rather than a higher saturated magnetic flux density Bs. When recording is performed in a high frequency region, the losses caused by eddy current generated in the upper core layers 22 and 40 must be reduced in order to appropriately supply recording magnetic fields from the upper core layers 22 and 40 to the upper magnetic pole layers 21 and 34, respectively. Accordingly, in the present invention, in order to obtain a high recording density, an NiFe alloy having a resistivity higher than that of a CoFeα alloy can be effectively used for the upper core layers 22 and 40. In the present invention, for example, a $Ni_{80}Fe_{20}$ alloy may be used for the upper core layers 22 and 40.

As described above, in the present invention, a CoFeα alloy is used for the upper magnetic pole layers 21 and 34, and an NiFe alloy is used for the upper core layers 22 and 40. As a result, when the upper core layers 22 and 40 are formed by electroplating, the upper magnetic pole layers 21 and 34 are appropriately prevented from being ionized and being dissolve out.

The element α in the present invention is Ni or Cr that forms a dense oxide film used as a passivation film. When the element mentioned above is added, the passivation films are formed on the surfaces of the upper magnetic pole layers 21 and 34, and hence, the upper magnetic pole layers 21 and 34 can be prevented from being ionized.

Accordingly, the ionization of the upper magnetic pole layers 21 and 34 can be appropriately suppressed, and hence, a magnetic pole having a high saturated magnetic flux density BS and superior corrosion resistance can be maintained.

In addition, the lower magnetic pole layers 19 and 32 are also preferably formed of a CoFeα alloy, and accordingly, when the upper core layers 22 and 40 are formed by plating, the ionization of the lower magnetic pole layers 19 and 32 can be effectively suppressed.

In the present invention, the lower magnetic pole layers 19 and 32 and/or the upper magnetic pole layers 21 and 34 may be formed of at least two magnetic layers laminated to each other. In the structure described above, magnetic layers in contact with the gap layers 20 and 33 are preferably formed of a CoFeα alloy having the composition described above. Accordingly, the magnetic flux can be further concentrated in the vicinity of the gap, and hence, a thin-film magnetic head which can meet the requirement of even higher recording density can be manufactured.

The magnetic layers other than those in contact with the gap layers 20 and 33 may be formed of any type of magnetic material having any composition; however, the magnetic layers mentioned above preferably have smaller saturated magnetic flux densities Bs than those of the magnetic layers in contact with the gap layers 20 and 33 and are preferably formed of, for example, an NiFe alloy. Accordingly, recording magnetic fields can be appropriately supplied to the magnetic layers in contact with the gap layers 20 and 33 from the other magnetic layers so that a high recording density can be obtained, and in addition, when the other magnetic layers are formed by plating, the ionization of the magnetic layers in contact with the gap layers 20 and 33 can be appropriately prevented.

In the present invention, the other magnetic layers are not necessary to be formed of an NiFe alloy and may be formed of a CoFeα alloy; however, it is preferable that the composition thereof be adjusted to have a saturated magnetic flux density Bs smaller than that of each of the magnetic layers in contact with the gap layers 20 and 33.

The saturated magnetic flux densities Bs of the lower magnetic pole layers 19 and 32 are preferably high; however, when they are smaller than the saturated magnetic flux densities Bs of the upper magnetic pole layers 21 and 34, respectively, so that the magnetic inversion of leakage flux is likely to occur between the lower magnetic pole layer and the upper magnetic pole layer, the writing density of signals on a recording medium can be further increased.

Figure 5:
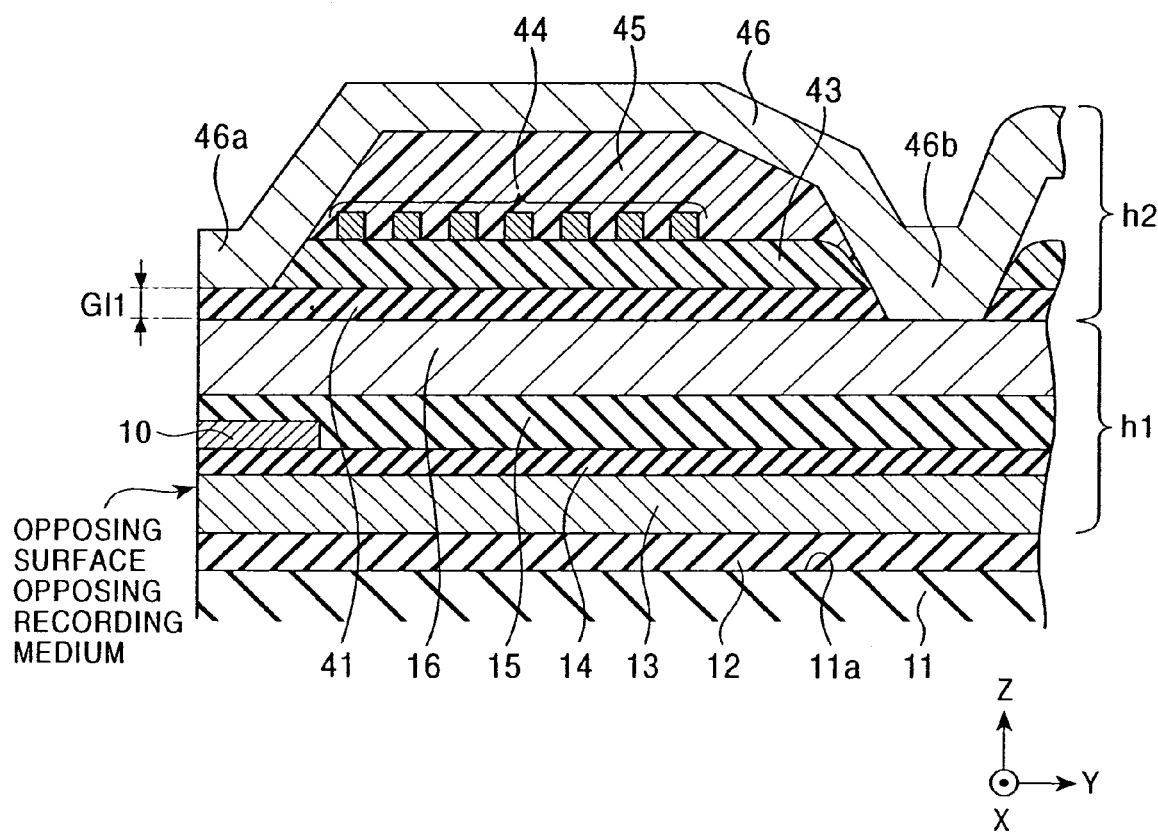
FIG. 5 is a longitudinal cross-sectional view of a thin-film magnetic head of a third embodiment according to the present invention.

FIG. 5 is a longitudinal cross-sectional view of a thin-film magnetic head of a third embodiment of the present invention.

In this embodiment, the structure of the MR head h1 is the same as that shown in FIG. 1. As shown in FIG. 5, a magnetic gap layer (nonmagnetic material layer) 41 composed of alumina or the like is formed on the lower core layer 16. In addition, a coil layer 44 in a spiral pattern in plan view is provided above the magnetic gap layer 41 with an insulating layer 43 composed of a polyimide resin or a resist material provided therebetween. The coil layer 44 is formed of a nonmagnetic conductive material such as copper (Cu) having a small electrical resistance.

In addition, the coil layer 44 is covered with an insulating layer 45 formed of a polyimide resin or a resist material, and on the insulating layer 45, an upper core layer 46 composed of a soft magnetic material is formed.

As shown in FIG. 5, a front portion 46a of the upper core layer 46 opposes the lower core layer 16 at the opposing surface opposing the recording medium with the magnetic gap layer 41 provided therebetween so as to form a magnetic gap having a magnetic gap length of Gl1, and as shown in FIG. 5, a base portion 46b of the upper core layer 46 is magnetically coupled with the lower core layer 16.

In the present invention, the lower core layer 16 and/or the upper core layer 46 are formed of an alloy represented by the formula $Co_xFe_yα_z$ in which the component ratio X of Co is 8 to 48 mass %, the component ratio Y of Fe is 50 to 90 mass %, the component ratio Z of the element α (the element α is at least one of Ni and Cr) is 2 to 20 mass %, and the equation X+Y+Z=100 mass % is satisfied.

In the present invention, it is preferable that the component ratio X of Co be 23 to 32 mass %, the component ratio Y of Fe be 58 to 71 mass %, the component ratio Z of the element α be 2 to 20 mass %, and the component ratios satisfy the equation X+Y+Z=100 mass %.

In addition, in the present invention, it is more preferable that the component ratio X of Co be 23.3 to 28.3 mass %, the component ratio Y of Fe be 63 to 67.5 mass %, the component ratio Z of the element α be 4.2 to 13.6 mass %, and the component ratios satisfy the equation X+Y+Z=100 mass %.

Furthermore, in the present invention, it is most preferable that the component ratios, X of Co, Y of Fe, and Z of the element α, be in the area surrounded by three points (X, Y, and Z) of (26.5, 64.6, and 8.9 mass %), (25.5, 63, and 11.5 mass %), and (23.3, 67.5, and 9.2 mass), and the component ratios satisfy the equation X+Y+Z=100 mass %.

A CoFeα alloy having the component ratios described above has a saturated magnetic flux density Bs of 2.0 T or more, an alloy having the preferable component ratios has a saturated magnetic flux density Bs of 2.15 T or more, an alloy having the more preferable component ratios has a saturated magnetic flux density Bs or 2.2 T or more, and an alloy having the most preferable component ratios has a saturated magnetic flux density Bs of more than 2.2 T.

Since the upper core layer 46 and/or the lower core layer 16 are formed of the CoFeα alloy described above having a saturated magnetic flux density Bs of 2.0 T or more, the magnetic flux can be concentrated in the vicinity of the gap, and the recording density can be increased, whereby a thin-film magnetic head having a higher recording density can be manufactured.

In addition, since the CoFeα alloy having the composition described above has crystals which are densely formed, the surface roughness of the film can be decreased, and hence, the corrosion resistance can be improved. In the present invention, the center line average roughness Ra of the film surface can be 5 nm or less. In addition, the coercive force Hc can be decreased. In particular, the coercive force Hc can be decreased to 1,580 A/m or less.

When a CoFeα alloy has the composition described above, a resistivity of 15 μΩ·cm or more can be obtained. In addition, the film stress can be 400 MPa or less. Furthermore, an anisotropic magnetic field Hk approximately equivalent to that of an NiFe alloy, which has been generally used as a soft magnetic material, can be obtained.

Figure 6:
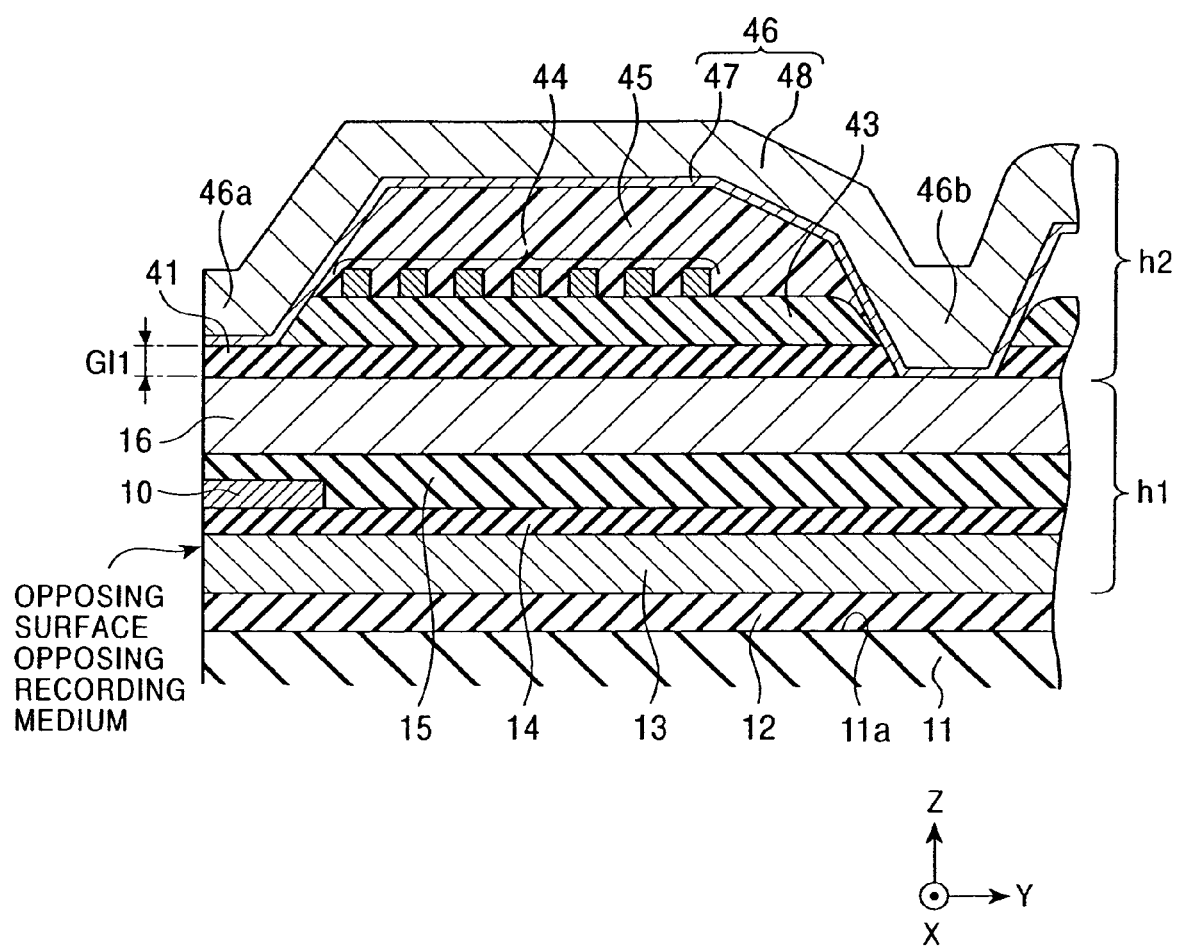
FIG. 6 is a longitudinal cross-sectional view of a thin-film magnetic head of a fourth embodiment of the present invention.

FIG. 6 is a longitudinal cross-sectional view of a thin-film magnetic head of a fourth embodiment of the present invention.

The point different from the thin-film magnetic head shown in FIG. 5 is that the upper core layer 46 is a laminate composed of two magnetic layers.

The upper core layer 46 is formed of a high Bs layer 47 having a high saturated magnetic flux density Bs and an upper layer 48 provided thereon.

In the present invention, the high Bs layer is formed of an alloy represented by the formula $Co_xFe_y\alpha_z$ in which the component ratio X of Co is 8 to 48 mass %, the component ratio Y of Fe is 50 to 90 mass %, the component ratio Z of the element α (the element α is at least one of Ni and Cr) is 2 to 20 mass %, and the equation X+Y+Z=100 mass % is satisfied.

In the present invention, it is preferable that the component ratio X of Co be 23 to 32 mass %, the component ratio Y of Fe be 58 to 71 mass %, the component ratio Z of the element α be 2 to 20 mass %, and the component ratios satisfy the equation X+Y+Z=100 mass %.

In addition, in the present invention, it is more preferable that the component ratio X of Co be 23.3 to 28.3 mass %, the component ratio Y of Fe be 63 to 67.5 mass %, the component ratio Z of the element α be 4.2 to 13.6 mass %, and the component ratios satisfy the equation X+Y+Z=100 mass %.

Furthermore, in the present invention, it is most preferable that the component ratios, X of Co, Y of Fe, and Z of the element α, be in the area surrounded by three points (X, Y, and Z) of (26.5, 64.6, and 8.9 mass %), (25.5, 63, and 11.5 mass %), and (23.3, 67.5, and 9.2 mass), and the component ratios satisfy the equation X+Y+Z=100 mass %.

Accordingly, the saturated magnetic flux density Bs of the high Bs layer 47 having the composition described above can be at least 2.0 T or more. In addition, the Bs can be 2.15 T or more by the preferable composition, can be 2.2 T or more by the more preferable composition, and can be more than 2.2 T by the most preferable composition.

Since the high Bs layer 47 composed of the CoFeα alloy is formed so that the crystals thereof are dense, the surface roughness of the high Bs layer 47 can be decreased, and hence, the corrosion resistance can be improved and the coercive force Hc can be decreased. In particular, the center line average roughness Ra of the film surface can be 5 nm or less, and the coercive force Hc can be 1,580 A/m or less. In addition, when the CoFeα alloy is used, the resistivity can be 15 μΩ·cm or more. Furthermore, the film stress can be 400 MPa or less.

The upper layer 48 forming the upper core layer 46 has a smaller saturated magnetic flux density compared to that of the high Bs layer 47; however, the resistivity is higher than that of the high Bs layer 47. The upper layer 48 is formed of, for example, an $Ni_{80}Fe_{20}$ alloy.

The saturated magnetic flux density Bs of the NiFe alloy described above is smaller than that of the CoFeα alloy of the present invention, but the resistivity is higher than that of the CoFeα alloy. Accordingly, the high Bs layer 47 has a higher saturated magnetic flux density Bs than that of the upper layer 48, the magnetic flux can be concentrated in the vicinity of the gap, and hence, the recording resolution can be improved. In this structure, the upper layer 48 may not be formed of an NiFe alloy and may be formed of a CoFeα alloy or the like. However, in the case described above, the composition of the upper layer 48 must be adjusted so that the saturated magnetic flux density Bs is smaller than that of the high Bs layer 47.

In addition, since the upper layer 48 having a high resistivity forms the upper core layer 46, the loss caused by eddy current generated when the recording frequency is increased can be reduced, and as a result, a thin-film magnetic head which can meet the requirement of even higher recording density can be manufactured.

In the present invention, as shown in FIG. 6, the high Bs layer 47 is preferably formed at the lower side that opposes the gap layer 41. In addition, the high Bs layer 47 may be formed only at the front portion 46a of the upper core layer 46 so as to be in direct contact with the gap layer 41.

In addition, the lower core layer 16 may also be formed of two layers, that is, may be formed of a high Bs layer and a layer having a high resistivity. In the structure described above, the high Bs layer is formed on the layer having the high resistivity and opposes the upper core layer 46 with the gap layer 41 provided therebetween.

In the embodiment shown in FIG. 6, the upper core layer 46 is a laminate composed of two layers; however, it may be a laminate composed of at least three layers. In the structure described above, the high Bs layer 47 is preferably formed so as to be in contact with the magnetic gap layer 41.

In addition, when the high Bs layer 47 is formed of the CoFeα alloy of the present invention, and the upper layer 48 is formed of an NiFe alloy by electroplating, since a passivation film of Ni or Cr is formed on the surface of the high Bs layer 47, a phenomenon in which the high Bs layer 47 is ionized and dissolved out can be appropriately suppressed.

Figure 7:
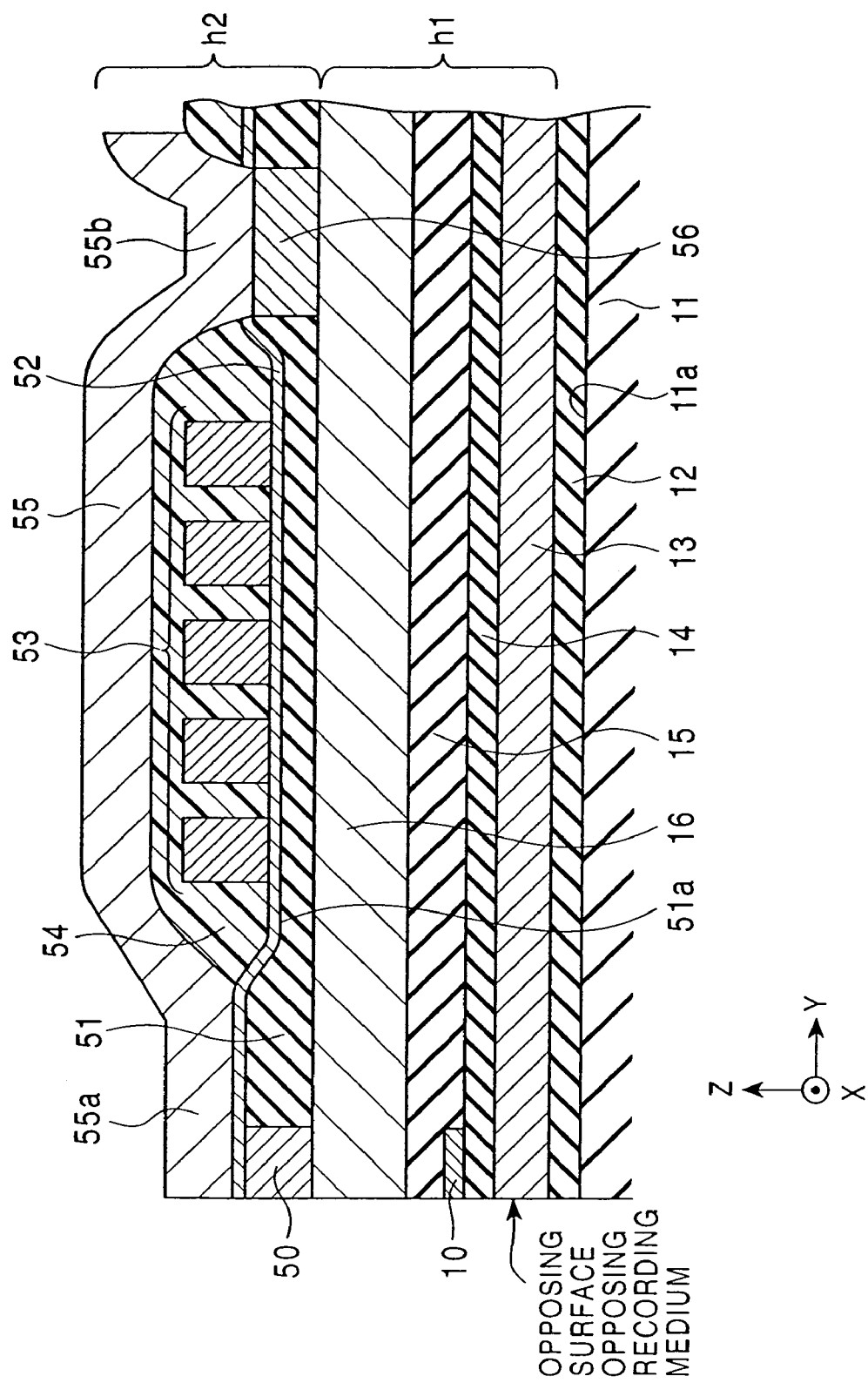
FIG. 7 is a longitudinal cross-sectional view of a thin-film magnetic head of a fifth embodiment of the present invention.

FIG. 7 is a longitudinal cross-sectional view of a thin-film magnetic head of a fifth embodiment of the present invention.

In the embodiment shown in FIG. 7, the structure of the MR head h1 is the same as that shown in FIG. 1. As shown in FIG. 7, a bulged lower magnetic pole layer 50 is formed on the lower core layer 16 so as to be exposed to the opposing surface opposing the recording medium. An insulating layer 51 is formed on the rear side of the lower magnetic pole layer 50 in the height direction (Y direction in the figure). The insulating layer 51 has a concave portion having a coil forming surface 51a thereon.

A gap layer 52 is formed on the lower magnetic pole layer 50 and the insulating layer 51. In addition, above the coil forming surface 51a of the insulating layer 51, a coil layer 53 is formed with the gap layer 52 provided therebetween. The coil layer 53 is covered with an organic insulating layer 54.

As shown in FIG. 7, a patterned upper core layer 55 is formed on the gap layer 52 and the insulating layer 54 by, for example, a flame plating method.

A front portion 55a of the upper core layer 55 is formed on the gap layer 52 so as to oppose the lower magnetic pole layer 50. A base portion 55b of the upper core layer 55 is magnetically coupled with the lower core layer 16 via a lifting layer 56 formed thereon.

In this embodiment, the upper core layer 55 and/or the lower magnetic pole layer 50 are formed of an alloy represented by the formula $Co_xFe_y\alpha_z$ in which the component ratio X of Co is 8 to 48 mass %, the component ratio Y of Fe is 50 to 90 mass %, the component ratio Z of the element α (the element α is at least one of Ni and Cr) is 2 to 20 mass %, and the equation X+Y+Z=100 mass % is satisfied.

In the present invention, it is preferable that the component ratio X of Co be 23 to 32 mass %, the component ratio Y of Fe be 58 to 71 mass %, the component ratio Z of the element α be 2 to 20 mass %, and the component ratios satisfy the equation X+Y+Z=100 mass %.

In addition, in the present invention, it is more preferable that the component ratio X of Co be 23.3 to 28.3 mass %, the component ratio Y of Fe be 63 to 67.5 mass %, the component ratio Z of the element α be 4.2 to 13.6 mass %, and the component ratios satisfy the equation X+Y+Z=100 mass %.

Furthermore, in the present invention, it is most preferable that the component ratios, X of Co, Y of Fe, and Z of the element α, be in the area surrounded by three points (X, Y, and Z) of (26.5, 64.6, and 8.9 mass %), (25.5, 63, and 11.5 mass %), and (23.3, 67.5, and 9.2 mass), and the component ratios satisfy the equation X+Y+Z=100 mass %.

As shown in FIG. 7, when the lower magnetic pole layer 50 is formed of the CoFeα alloy described above having a higher saturated magnetic flux density Bs than that of the lower core layer 16, the magnetic flux can be concentrated in the vicinity of the gap, and hence, the recording density can be improved.

In addition, the upper core layer 55 may be entirely formed of the CoFeα alloy described above. However, the upper core layer 55 may also be a laminate composed of at least two layers similar to that shown in FIG. 6, and a layer opposing the gap layer 52 may be formed of the CoFeα alloy film used as a high Bs layer. In the case described above, in order to concentrate the magnetic flux in the vicinity of the gap so as to improve the recording density, it is preferable that the front portion 55a of the upper core layer 55 only have a laminate structure composed of at least of two magnetic layers and that the high Bs layer be formed in contact with the gap layer 52.

In the embodiments shown in FIGS. 1 to 7 according to the present invention, the CoFeα alloy film is preferably formed by plating. In the present invention, the CoFeα alloy may be formed by an electroplating using a pulse current.

When the CoFeα alloy is formed by plating, a film having an optional thickness can be formed, and a thicker film can be formed compared to the case of using sputtering.

In addition, in the embodiments described above, the layer indicated by reference numeral 16 is used as the lower core layer and also as the upper shield layer; however, the lower core layer and the upper shield layer may be separately formed. In the case described above, an insulating layer is provided between the lower core layer and the upper shield layer.

A general method for manufacturing the thin-film magnetic heads shown in FIGS. 1 to 7 will be described below.

The thin-film magnetic head shown in FIGS. 1 and 2 is formed by the steps of forming the Gd determining layer 17 on the lower core layer 16, and subsequently, forming the magnetic pole layer 18 composed of the lower magnetic pole layer 19, the nonmagnetic gap layer 20, and the upper magnetic pole layer 21 by continuous plating using a resist from the opposing surface opposing the recording medium in the height direction. Next, after the insulating layer 23 is formed from the rear side of the magnetic pole layer 18 in the height direction, the upper surface of the magnetic pole layer 18 and the upper surface of the insulating layer 23 are planarized so as to be flush with each other by, for example, a CMP technique. After the coil layer 24 in the spiral pattern is formed on the insulating layer 23, the insulating layer 25 is formed on the coil layer 24. Next, the upper core layer 22 is formed on the magnetic pole portion 18 and the insulating layer 25 by, for example, a flame plating method.

The thin-film magnetic head shown in FIGS. 3 and 4 is formed by the steps of forming the insulating layer 31 on the lower core layer 16, and subsequently, forming the groove 31a for forming the track width in the insulating layer 31 from the opposing surface opposing the recording medium in the height direction. In addition, both sides of the groove 31a for forming the track width are formed so as to have the inclined surfaces 31c shown in FIG. 3.

In the groove 31a for forming the track width, the lower magnetic pole layer 32 and the nonmagnetic gap layer 33 are formed. After the Gd determining layer 37 is formed on the gap layer 33 and the insulating layer 31, the upper magnetic pole layer 34 is formed on the gap layer 33 by plating. Next, after the coil layer 38 in the spiral pattern is formed on the insulating layer 31, the insulating layer 39 is formed on the coil layer 38. Subsequently, the upper core layer 40 is formed on the upper magnetic pole layer 34 and the insulating layer 39 by, for example, a flame plating method.

The thin-film magnetic head shown in FIGS. 5 and 6 is formed by the steps of first forming the gap layer 41 on the lower core layer 16, forming the insulating layer 43 on the gap layer 41, and subsequently, forming the patterned coil layer 44 on the insulating layer 43. After the insulating layer 45 is formed on the coil layer 44, the patterned upper core layer 46 is formed on the gap layer 41 and the insulating layer 45 by a flame plating method.

The thin-film magnetic head shown in FIG. 7 is formed by the steps of forming the lower magnetic pole layer 50 on the lower core layer 16 by using a resist, and subsequently, forming the insulating layer 51 on the rear side of the lower magnetic pole layer 50 in the height direction. After the upper surfaces of the lower magnetic pole layer 50 and the insulating layer 51 are planarized by a CMP method, the coil forming surface 51a in the concave form is formed on the insulating layer 51. Next, after the gap layer 52 is formed on the lower magnetic pole layer 50 and the insulating layer 51, the coil layer 53 in the spiral pattern is formed on the gap layer 52, and in addition, the insulating layer 54 is then formed on the coil layer 53. Subsequently, the patterned upper core layer 55 is formed on the gap layer 52 and the insulating layer 54 by, for example, a flame plating method.

Next, a method for forming the $Co_xFe_y\alpha_z$ alloy of the present invention is described below, in which the component ratio X of Co is 8 to 48 mass %, the component ratio Y of Fe is 50 to 90 mass %, the component ratio Z of the element α (the element α is at least one of Ni and Cr) is 2 to 20 mass %, and the equation X+Y+Z=100 mass % is satisfied.

In the present invention, the CoFeα alloy is formed by electroplating using a pulse current.

Electroplating using a pulse current is performed by, for example, repeating on and off operations of a current controlling element so that there are periods in which a current flows and periods in which current does not flow during plating. Since there are periods in which current does not flow, a CoFeα alloy film is gradually formed by plating, and even when the ratio of Fe ion concentration is increased in a plating solution, the deviation of current density distribution during plating can be reduced compared to that of a conventional electroplating method using a DC current.

The pulse current preferably repeats on and off operations in a cycle of some seconds so that the duty ratio is approximately 0.1 to 0.5. The conditions of the pulse current have the influence on the average crystal diameter and the center line average roughness Ra of a CoFeα alloy.

In the electroplating using the pulse current described above, since the deviation of the current density distribution during plating can be reduced, the content of Fe in a CoFeα alloy can be increased compared to that obtained by electroplating using a DC current.

In the present invention, according to the electroplating using the pulse current described above, the degree of freedom of adjusting the component ratios is increased compared to the conventional electroplating using a DC current, and as a result, the component ratio X of Co can be easily adjusted in the range of 8 to 48 mass %, the component ratio Y of Fe can be easily adjusted in the range of 50 to 90 mass %, and the component ratio Z of the element α can be easily adjusted in the range of 2 to 20 mass %.

In addition, in the present invention, when the composition of the plating solution is specified as described below, a component ratio X of Co of 23 to 32 mass %, a component ratio Y of Fe of 58 to 71 mass %, and a component ratio Z of the element α of 2 to 20 mass % can be obtained. Consequently, the CoFeα alloy having the composition described above can have a saturated magnetic flux density Bs of 2.15 T or more and a center line average roughness of the film surface of 5 nm or less, and hence, a soft magnetic film having a high saturated magnetic flux density Bs and superior corrosion resistance can be effectively manufactured.

In the present invention, the ratio of Fe ion concentration to Co ion concentration is set to 1.5 or more, and the ratio of the Fe ion concentration to α ion concentration is set to 2 to 4. As shown in the experimental results described below, when plating is performed using a plating solution having the ratios described above, the component ratio of Fe in the CoFeα alloy can be 58 to 71 mass %, and the component ratio of Co can be 23 to 32 mass %.

On the other hand, when the plating solution has ratios of ion concentrations out of the ranges described above, the content of Fe may be less than 50 mass %, a saturated magnetic flux density Bs of 2.0 T or more may not be obtained in some cases, and hence, a high saturated magnetic flux density Bs can not be reliably obtained. In addition, the center line average roughness Ra of the film surface may be more than 5 nm in some cases, and the corrosion resistance may be degraded.

In the present invention, the Fe ion concentration is preferably lower than that in a conventional plating solution, and in particular, 1.0 to 2.0 g/l is preferable. Previously, for example, the Fe ion concentration was approximately 4.0 g/l; however, when the concentration is decreased, the stirring effect can be improved, the Fe content in a CoFeα alloy is more appropriately increased, and in addition, dense crystals can be formed, whereby a CoFeα alloy having superior corrosion resistance can be manufactured.

In the present invention, plating is preferably performed in a plating solution having a ratio of the Fe ion concentration to the Co ion concentration of 1.5 or more and a ratio of the Fe ion concentration to the α ion concentration of 2 to 3.4 so that a CoFeα alloy film is formed in which the component ratio X of Co is 23.3 to 28.3 mass %, the component ratio Y of Fe is 63 to 67.5 mass %, the component ratio Z of the element α is 4.2 to 13.6 mass %, and the equation X+Y+Z=100 mass % is satisfied.

The CoFeα alloy having the composition described above can have a saturated magnetic flux density Bs of 2.2 T or more and a center line average roughness of the film surface of 5 nm or less, and hence, a soft magnetic film having a high saturated magnetic flux density Bs and superior corrosion resistance can be effectively manufactured.

In the present invention, plating is most preferably performed in a plating solution having a ratio of the Fe ion concentration to the Co ion concentration of 1.7 or more and a ratio of the Fe ion concentration to the α ion concentration of 2 to 3.4 so that a CoFeα alloy film is formed in which the component ratios, X of Co, Y of Fe, and Z of the element α, are in the area surrounded by three points (X, Y, and Z) of (26.5, 64.6, and 8.9 mass %), (25.5, 63, and 11.5 mass %), and (23.3, 67.5, and 9.2 mass %), and the equation X+Y+Z=100 mass % is satisfied.

The CoFeα alloy having the composition described above can have a saturated magnetic flux density Bs of more than 2.2 T and a center line average roughness of the film surface of 5 nm or less, and hence, a soft magnetic film having a high saturated magnetic flux density Bs and superior corrosion resistance can be effectively manufactured. In particular, it was found that when the component ratios of Fe, Co, and α were set to 66.1 mass %, 24.6 mass %, and 9.3 mass %, respectively, the saturated magnetic flux density Bs could be increased up to 2.25 T.

In addition, in the present invention, sodium saccharin ($C_6H_4CONNaSO_2$) is preferably contained in the plating solution for forming a CoFeα alloy. Since the sodium saccharin described above serves as a stress relaxation agent, the film stress of a CoFeα alloy formed by plating can be reduced. When Ni is used as the element α, the film stress can be further decreased.

In addition, 2-butyne-1,4-diol is preferably contained in the plating solution for forming a CoFeα alloy. Accordingly, the formation of coarse crystal grains of the CoFeα alloy can be suppressed, and the coercive force Hc can be decreased.

Furthermore, in the present invention, sodium 2-ethylhexyl sulfate is preferably contained in the plating solution for forming a CoFeα alloy.

The sodium 2-ethylhexyl sulfate described above is a surfactant. When the sodium 2-ethylhexyl sulfate is contained, hydrogen generated during the formation of a CoFeα alloy by plating can be removed, and hence, the adhesion of the hydrogen to the plating film can be prevented. When hydrogen adheres to the plating film, the crystals are not densely formed, and hence, the surface roughness is very badly increased. Accordingly, since the hydrogen is removed in the present invention, the surface roughness of the plating film can be decreased, and the coercive force Hc can be decreased.

In place of the sodium 2-ethylhexyl sulfate described above, sodium lauryl sulfate may be used; however, compared to the sodium 2-ethylhexyl sulfate, the sodium lauryl sulfate described above is likely to produce bubbles when contained in a plating solution, and hence, it has been difficult to appropriately add the sodium lauryl sulfate so as to effectively remove hydrogen. Accordingly, in the present invention, sodium 2-ethylhexyl sulfate, which is unlikely to produce bubbles compared to the sodium lauryl sulfate, is preferably used since it can be contained so as to effectively remove hydrogen.

In addition, boric acid is preferably contained in the plating solution. Boric acid serves as a pH buffer agent in the vicinity of surfaces of electrodes and is effectively used for increasing the gloss of a plating film.

In the present invention, as an application of a CoFeα alloy, thin-film magnetic heads shown in FIGS. 1 to 7 have been described; however, the application is not limited thereto. For example, the CoFeα alloy described above may be applied to, for example, a planar type magnetic element such as a thin-film inductor.

EXAMPLES

In the present invention, CoFeα alloys were formed in plating solutions described below by electroplating using a pulse current, and the relationship of the component ratios of the CoFeNi alloy with the soft magnetic properties and the film properties were measured.

The composition of a plating solution in which the ratio of Fe ion concentration to Co ion concentration was less than 1.5 and the ratio of the Fe ion concentration to α ion concentration was less than 2 is shown in Table 1.

TABLE 1

Plating Solution in which Fe Ion/Co Ion is less than 1.5 and Fe Ion/Ni Ion is less than 2

| | |
|---|---|
| Fe Ion | 2.0 g/l |
| Co Ion | 1.35 g/l |
| Ni Ion | 2.23 g/l |
| Sodium Saccharin | 0.8 g/l |
| Sodium 2-Ethylhexyl Sulfate | 0.15 g/l |
| 2-Butyne-1,4-Diol | 1 g/l |
| Boric Acid | 25 g/l |
| Sodium Chloride | 25 g/l |

In the plating solution shown in Table 1, the Fe ion concentration, the Co ion concentration, and the Ni ion concentration were set to 2 g/l, 1.35 g/l, and 2.23 g/l, respectively. In addition, sodium saccharin, sodium 2-ethylhexyl sulfate, 2-butyne-1,4-diol, boric acid, and sodium chloride in the amounts shown in Table 1 were added.

Next, the compositions of plating solutions in which the ratio of Fe ion concentration to Co ion concentration was 1.5 or more and the ratio of the Fe ion concentration to α ion concentration was less than 2 are shown in Table 2.

TABLE 2

Plating Solution in which Fe Ion/Co Ion is 1.5 or more and Fe Ion/Ni Ion is less than 2

| | |
|---|---|
| Fe Ion | 2.0, 3.72 g/l |
| Co Ion | 1.26, 2.38 g/l |
| Ni Ion | 2.0, 3.29 g/l |
| Sodium Saccharin | 0.6, 1.2 g/l |
| Sodium 2-Ethylhexyl Sulfate | 0.15, 0.4 g/l |
| 2-Butyne-1,4-Diol | 0.16 g/l |
| Boric Acid | 25 g/l |
| Sodium Chloride | 25 g/l |

In the plating solution shown in Table 2, the Fe ion concentration, the Co ion concentration, and the Ni ion concentration were set to 2 g/l, 1.26 g/l, and 2 g/l, respectively. In addition, in the other plating solution, the Fe ion concentration, the Co ion concentration, and the Ni ion concentration were set to 3.72 g/l, 2.38 g/l, and 3.29 g/l, respectively. In addition, sodium saccharin, sodium 2-ethylhexyl sulfate, 2-butyne-1,4-diol in the amounts shown in Table 2 were added to the individual plating solutions described above, whereby a plurality of plating solutions having different compositions from each other were prepared. Next, CoFeNi alloys were produced using the plurality of plating solutions described above.

Next, the compositions of plating solutions in which the ratio of Fe ion concentration to Co ion concentration was 1.5 or more and the ratio of the Fe ion concentration to α ion concentration was 2 to 4 are shown in Table 3.

TABLE 3

Plating Solution in which Fe Ion/Co Ion is 1.5 or more and Fe Ion/Ni Ion is 2 to 4

| | |
|---|---|
| Fe Ion | 1.17, 1.29, 1.41, 1.61, 1.81 g/l |
| Co Ion | 0.57, 0.69, 0.73, 0.87 g/l |
| Ni Ion | 0.35, 0.45, 0.49, 0.54 g/l |
| Sodium Saccharin | 0.8, 1.2 g/l |
| Sodium 2-Ethylhexyl Sulfate | 0.15, 0.3 g/l |
| 2-Butyne-1,4-Diol | 0, 1.2 g/l |
| Boric Acid | 25 g/l |
| Sodium Chloride | 25 g/l |

In one of the plating solution shown in Table 3, the Fe ion concentration, the Co ion concentration, and the Ni ion concentration were set to 1.17 g/l, 0.57 g/l, and 0.35 g/l, respectively. In addition, in another plating solution, the Fe ion concentration, the Co ion concentration, and the Ni ion concentration were set to 1.17 g/l, 0.73 g/l, and 0.45 g/l, respectively. In another plating solution, the Fe ion concentration was set to 1.29 g/l, the Co ion concentration was set to 0.73 or 0.87 g/l, and the Ni ion concentration was set 0.45 or 0.49 g/l. In another plating solution, the Fe ion concentration was set to 1.41 g/l, the Co ion concentration was set to 0.87 or 0.69 g/l, and the Ni ion concentration was set 0.54 or 0.35 g/l. In another plating solution, the Fe ion concentration, the Co ion concentration, and the Ni ion concentration were set to 1.61 g/l, 0.87 g/l, and 0.54 g/l, respectively. In another plating solution, the Fe ion concentration, the Co ion concentration, and the Ni ion concentration were set to 1.81 g/l, 0.87 g/l, and 0.54 g/l, respectively. In addition, sodium saccharin, sodium 2-ethylhexyl sulfate, 2-butyne-1, 4-diol in the amounts shown in Table 2 were added to the individual plating solutions described above, whereby a plurality of plating solutions having different compositions from each other were prepared. Next, CoFeNi alloys were produced using the plurality of plating solutions described above.

Next, the compositions of plating solutions in which the ratio of Fe ion concentration to Co ion concentration was 1.5 or more and the ratio of the Fe ion concentration to α ion concentration was 3.4 or less are shown in Table 4.

TABLE 4

Plating Solution in which Fe Ion/Co Ion is 1.5 or more and Fe Ion/Ni Ion is 3.4 or less

| | |
|---|---|
| Fe Ion | 1.17, 1.29, 1.60, 1.81 g/l |
| Co Ion | 0.73, 0.87 g/l |
| Ni Ion | 0.45, 0.49, 0.54 g/l |
| Sodium Saccharin | 1.2 g/l |
| Sodium 2-Ethylhexyl Sulfate | 0.3 g/l |
| 2-Butyne-1,4-Diol | 1.2 g/l |
| Boric Acid | 25 g/l |
| Sodium Chloride | 25 g/l |

Next, the compositions of plating solutions in which the ratio of Fe ion concentration to Co ion concentration was 1.7 or more and the ratio of the Fe ion concentration to α ion concentration was 3.4 or less are shown in Table 5.

TABLE 5

Plating Solution in which Fe Ion/Co Ion is 1.7 or more and Fe Ion/Ni Ion is 3.4 or less

| | |
|---|---|
| Fe Ion | 1.29, 1.60, 1.81 g/l |
| Co Ion | 0.73, 0.87 g/l |
| Ni Ion | 0.45, 0.49, 0.54 g/l |
| Sodium Saccharin | 1.2 g/l |
| Sodium 2-Ethylhexyl Sulfate | 0.3 g/l |
| 2-Butyne-1,4-Diol | 1.2 g/l |
| Boric Acid | 25 g/l |
| Sodium Chloride | 25 g/l |

Next, the composition of a plating solution in which the ratio of Fe ion concentration to Co ion concentration was 1.8 and the ratio of the Fe ion concentration to α ion concentration is 3.0 or less was shown in Table 6.

TABLE 6

Plating Solution in which Fe Ion/Co Ion is 1.8 and Fe Ion/Ni Ion is 3.0 or less

| | |
|---|---|
| Fe Ion | 1.60 g/l |
| Co Ion | 0.87 g/l |
| Ni Ion | 0.54 g/l |
| Sodium Saccharin | 1.2 g/l |
| Sodium 2-Ethylhexyl Sulfate | 0.3 g/l |
| 2-Butyne-1,4-Diol | 1.2 g/l |
| Boric Acid | 25 g/l |
| Sodium Chloride | 25 g/l |

Next, the composition of a plating solution in which the ratio of Fe ion concentration to Co ion concentration was 1.5 or more and the ratio of the Fe ion concentration to α ion concentration was more than 4 are shown in Table 5.

TABLE 7

Plating Solution in which Fe Ion/Co Ion is 1.5 or more and Fe Ion/Ni Ion is more than 4

| | |
|---|---|
| Fe Ion | 1.17 g/l |
| Co Ion | 0.73 g/l |
| Ni Ion | 0.11 g/l |
| Sodium Saccharin | 1.2 g/l |
| Sodium 2-Ethylhexyl Sulfate | 0.3 g/l |
| 2-Butyne-1,4-Diol | 1.2 g/l |
| Boric Acid | 25 g/l |
| Sodium Chloride | 25 g/l |

When CoFeNi alloys were formed using the plating solutions shown in Tables 1 to 7, the following conditions were commonly used.

The plating solution temperature was first set to 30° C. In addition, the pH of the plating solution was set to 2.8. The current density was set to 46.8 mA/cm$^2$. Furthermore, the duty ratio (ON/OFF) of a pulse current was set to 400/1,000 msec. A Fe electrode was used as the anode.

The soft magnetic properties and film properties of the CoFeNi alloys formed using the plating solutions shown in Tables 1 to 7 are shown below.

TABLE 8

| | |
|---|---|
| Fe Component | 52.8 to 53.2 mass % |
| Co Component | 30.3 to 32.2 mass % |
| Bs | 2.09 to 2.10 T |
| Surface Roughness | 1.6 to 2.9 nm |
| Film Stress | 212 to 235 MPa |

Table 8 shows the experimental results obtained by the composition shown in Table 1, that is, the experimental results obtained when the ratio of the Fe ion concentration to the Co ion concentration was less than 1.5, and the ratio of the Fe ion concentration to the Ni ion concentration was less than 2.

As shown in Table 8, the component ratio of Fe of the CoFeNi alloy was 52.8 to 53.2 mass %, and the component ratio of Co was 30.3 to 32.2 mass %.

In addition, as shown in Table 8, the center line average roughness of the film surface was superior, such as 1.6 to 2.9 nm. Furthermore, the saturated magnetic flux density Bs could be 2.0 T or more, and the variation thereof was also small. However, the maximum value of the Bs was 2.1 T.

Since the Ra was 1.6 to 2.9 nm, it was expected that the crystallinity of the alloy was superior, and hence, it was believed that the small variation of the saturated magnetic flux density Bs shown in Table 8 was due to the superior crystallinity. However, it was also believed that a Bs of not more than 2.2 T was due to the small Fe content.

TABLE 9

| | |
|---|---|
| Fe Component | 52.3 to 56.1 mass % |
| Co Component | 30.7 to 30.8 mass % |
| Bs | 2.07 to 2.14 T |
| Surface Roughness | 2.9 to 3.5 nm |
| Film Stress | 235 to 291 MPa |

Table 9 shows the experimental results obtained by the compositions shown in Table 2, that is, the experimental results obtained when the ratio of the Fe ion concentration to the Co ion concentration was 1.5 or more, and the ratio of the Fe ion concentration to the Ni ion concentration was less than 2.

As shown in Table 9, the component ratio of Fe of the CoFeNi alloy was 52.3 to 56.1 mass %, and the component ratio of Co was 30.7 to 30.8 mass %.

In addition, as shown in Table 9, the center line average roughness of the film surface was 2.9 to 3.5 nm. Furthermore, the saturated magnetic flux density BS was more than 2 T, and the maximum value thereof was 2.14 T which was larger than that shown in Table 8. However, the variation of the saturated magnetic flux density Bs was increased. It was believed that since the Ra was 2.9 to 3.5 nm, which were larger than those shown in Table 8, the crystallinity of the alloy was degraded. In addition, the reason the saturated magnetic flux density was larger than that shown in Table 8 was believed that the Fe content was slightly increased; however, the reason the saturated magnetic flux density Bs was not more than 2.2 T was believed that the Fe content was still not enough.

TABLE 10

| | |
|---|---|
| Fe Component | 58 to 71 mass % |
| Co Component | 23 to 32 mass % |
| Ni Component | 2 to 20 mass % |
| Bs | 2.16 to 2.25 T |
| Surface Roughness | 2.3 to 5 nm |
| Film Stress | 18 to 400 MPa |

Table 10 shows the experimental results obtained by the compositions shown in Table 3, that is, the experimental results obtained when the ratio of the Fe ion concentration to the Co ion concentration was 1.5 or more, and the ratio of the Fe ion concentration to the Ni ion concentration was 2 to 4.

As shown in Table 10, the component ratio of Fe of the CoFeNi alloy was 58 to 71 mass %, and the component ratio of Co was 23 to 32 mass %.

As shown in Table 10, the saturated magnetic flux density Bs was 2.16 to 2.25 T, that is, the saturated magnetic flux density Bs was always more than 2.0 T, and in addition, a high saturated magnetic flux density of 2.15 T or more could be obtained.

In addition, the center line average roughness Ra of the film surface was 2.3 nm to 5 nm, that is, the surface roughness could be appropriately decreased.

As shown in Table 10, in addition to a very high saturated magnetic flux density Bs of more than 2.15 T, a center line average roughness of the film surface of 5 nm or less could be obtained, which were superior to those shown in Tables 8 and 9. Consequently, in the present invention, a solution in which the ratio of the Fe ion concentration to the Co ion concentration was 1.5 or more and the ratio of the Fe ion concentration to the Ni ion concentration was 2 to 4 was regarded as a preferable plating solution.

TABLE 11

| | |
|---|---|
| Fe Component | 63.1 to 67.5 mass % |
| Co Component | 23.3 to 28.3 mass % |
| Ni Component | 4.2 to 13.6 mass % |
| Bs | 2.2 to 2.25 T |
| Surface Roughness | 2.7 to 5 nm |
| Film Stress | 168 to 400 MPa |

Table 11 shows the experimental results obtained by the compositions shown in Table 4, that is, the experimental results obtained when the ratio of the Fe ion concentration to the Co ion concentration was 1.5 or more, and the ratio of the Fe ion concentration to the Ni ion concentration was 2 to 3.4.

As shown in Table 11, the component ratio of Fe of the CoFeNi alloy was 63 to 67.5 mass %, the component ratio of Co was 23.3 to 28.3 mass %, and the component ratio of Ni was 4.2 to 13.6 mass %.

As shown in Table 11, the saturated magnetic flux density Bs was 2.2 to 2.25 T, that is, it was found that a high saturated magnetic flux density Bs of 2.0 T or more could always be obtained. In addition, the center line average roughness Ra of the film surface was 2.7 nm to 5 nm, that is, the surface roughness was small.

Consequently, a solution in which the ratio of the Fe ion concentration to the Co ion concentration was 1.5 or more and the ratio of the Fe ion concentration to the Ni ion concentration was 2 to 3.4 was regarded as a more preferable plating solution.

TABLE 12

| | | | |
|---|---|---|---|
| Fe Component (mass %) | 63.0 | 64.6 | 67.5 |
| Co Component (mass %) | 25.5 | 26.5 | 23.3 |
| Ni Component (mass %) | 11.5 | 8.9 | 9.2 |
| Bs | | 2.2 to 2.25 T | |
| Surface Roughness | | 2.7 to 5 nm | |
| Film Stress | | 329 to 400 MPa | |

Table 12 shows the experimental results obtained by the compositions shown in Table 5, that is, the experimental results obtained when the ratio of the Fe ion concentration to the Co ion concentration was 1.7 or more, and the ratio of the Fe ion concentration to the Ni ion concentration was 2 to 3.4.

As shown in Table 12, the component ratio of Fe was 63 to 67.5 mass %, and the component ratio of Co was 23.3 to 26.5 mass %. In addition, the component ratios of Fe, Co, and Ni were in the area surrounded by three points in the ternary diagram, that is, the area surrounded by a point represented by component ratios of Fe, Co, and Ni of 64.6, 26.5, and 8.9 mass %, respectively, a point represented by component ratios of Fe, Co, and Ni of 63, 25.5, and 11.5 mass %, and a point represented by component ratios of Fe, Co, and Ni of 67.5, 23.3, and 9.2 mass %.

As shown in Table 12, the saturated magnetic flux density Bs was more than 2.2 to 2.25 T, that is, it was found that, compared to the case shown in Table 11, a saturated magnetic flux density Bs of more than 2.2 T could always be obtained. In addition, the center line average roughness Ra of the film surface was 2.7 to 5 nm, that is, the surface roughness was small.

Consequently, a solution in which the ratio of the Fe ion concentration to the Co ion concentration was 1.7 or more and the ratio of the Fe ion concentration to the Ni ion concentration was 2 to 3.4 was regarded as the most preferable plating solution.

TABLE 13

| | |
|---|---|
| Fe Component | 66.1 mass % |
| Co Component | 24.6 mass % |
| Bs | 2.25 T |
| Surface Roughness | 2.7 nm |
| Film Stress | 359 MPa |

Table 13 shows the experimental results obtained by the composition shown in Table 6, that is, the experimental results obtained when the ratio of the Fe ion concentration to the Co ion concentration was 1.8, and the ratio of the Fe ion concentration to the Ni ion concentration was 2 to 3.

As shown in Table 13, the component ratio of Fe was 66.1 mass %, the component ratio of Co was 24.6 mass %, and the component ratio of Ni was 9.3 mass %.

As shown in Table 13, a very high saturated magnetic flux density Bs of 2.25 T could be obtained. In addition, the center line average roughness Ra of the film surface was 2.7 nm, that is, the surface roughness was small.

TABLE 14

| | |
|---|---|
| Fe Component | 72 mass % |
| Co Component | 25.6 mass % |
| Ni Component | 2.4 mass % |
| Bs | 2.15 T |
| Surface Roughness | 5.4 nm |
| Film Stress | 387 MPa |

Table 14 shows the experimental results obtained by the composition shown in Table 7, that is, the experimental results obtained when the ratio of the Fe ion concentration to the Co ion concentration was 1.5 or more, and the ratio of the Fe ion concentration to the Ni ion concentration was more than 4.

As shown in Table 14, the component ratio of Fe was 72 mass %, the component ratio of Co was 25.6 mass %, and the component ratio of Ni was 2.4 mass %.

As shown in Table 14, the saturated magnetic flux density Bs was 2.15 T, that is, a high saturated magnetic flux density Bs of more than 2.0 T could be obtained. However, the center line average roughness Ra of the film surface was more than 5 nm, such as 5.4 nm, that is, the surface roughness was increased.

The reason the surface roughness was increased is believed that the ratio of the Fe ion concentration to the Co ion concentration shown in Table 7 was higher than those shown in Tables 1 to 6.

When the Fe ion concentration is sufficiently large compared to the Ni ion concentration, abnormal precipitation may occur in which the Fe is preferentially precipitated, and a dense film may not be formed since coarse crystal grains are formed. As a result, it is believed that the surface roughness of the film is increased.

The possibility of reducing the surface roughness also largely depends on the Fe ion concentration itself. In the present invention, it is preferable that the Fe ion concentration be in the range of 1.0 to 2.0 g/l. In this connection, a conventional Fe ion concentration was approximately 4.0 g/l. When the Fe ion concentration is decreased as described in the present invention, the stirring effect can be increased, the Fe content in the CoFeNi alloy can be increased, and in addition, a dense film can be formed since the size of the crystal grains can be decreased, whereby the surface roughness can be decreased.

In addition, when 2-butyne-1,4-diol is contained, the formation of coarse crystal grains of a CoFeNi alloy, formed by plating, can be suppressed, it is unlikely that voids would be generated between the crystals due to smaller diameters of crystal grains, and hence, the surface roughness of the film can be decreased.

Next, the relationships of the Fe content in each CoFeNi alloy produced in the experiments described above with the soft magnetic properties and the film properties were measured, and the results will be described below. In addition, concerning an NiFe alloy, the relationships of the Fe content therein with the soft magnetic properties and the film properties were also measured. The NiFe alloy was formed by electroplating using a pulse current under the conditions equivalent to those for plating of the CoFeNi alloy.

Figure 8:
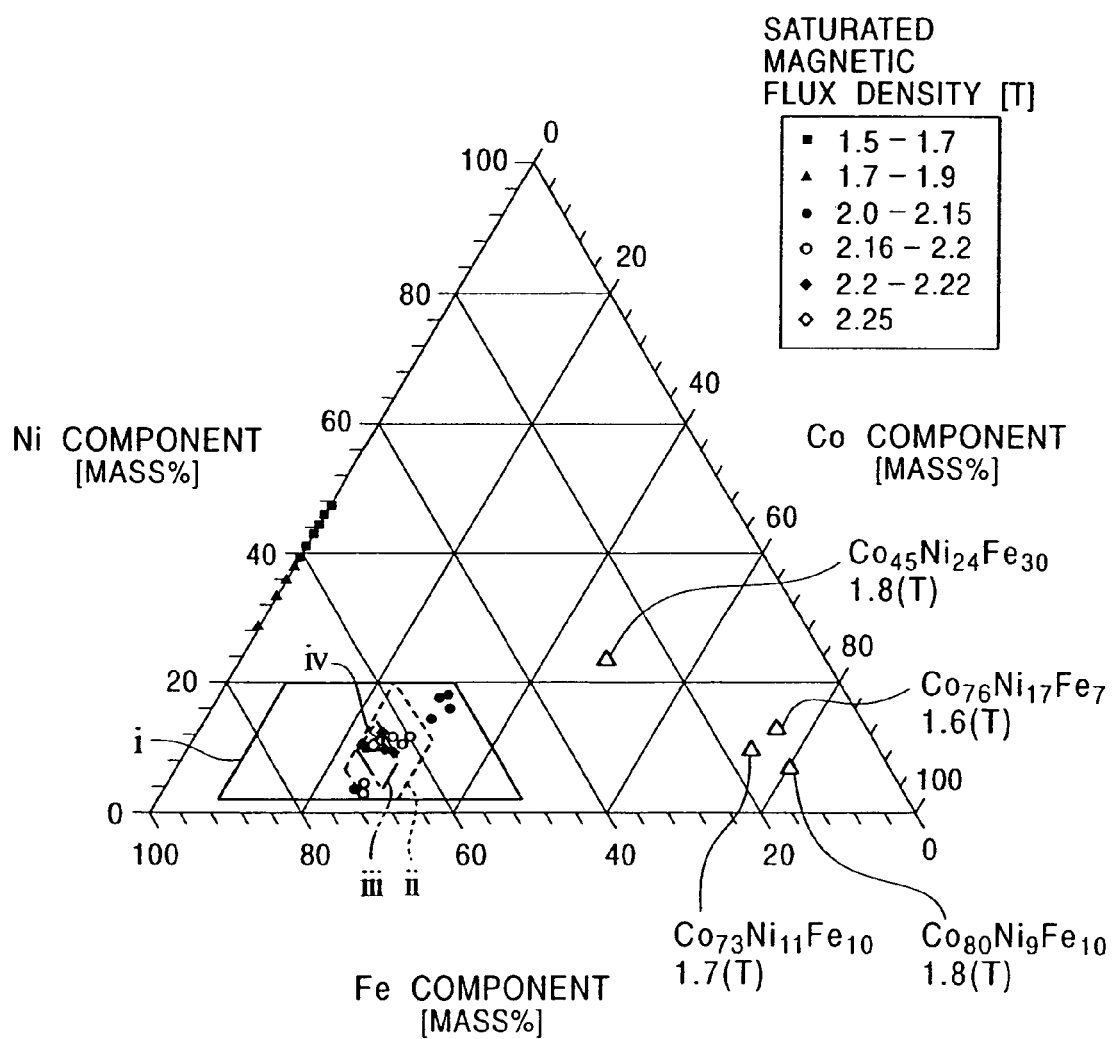
FIG. 8 is a ternary diagram showing the relationship between the composition of a CoFeNi alloy formed by an electroplating method using a pulse current, the composition of an NiFe alloy, and the saturated magnetic flux density Bs.

FIG. 8 is a ternary diagram showing the relationship between the component ratios of a CoFeNi alloy and the saturated magnetic flux density Bs.

As shown in FIG. 8, it was found that the saturated magnetic flux densities Bs of NiFe alloys (shown on the line of the Ni component of the ternary diagram) were all 1.9 T or less, that is, were not more than 2.0 T. In addition, the relationship between the component ratios of CoFeNi alloys shown in Table 2 of U.S. Pat. No. 6,063,512 and the saturated magnetic flux density Bs was shown by Δ in the ternary diagram.

Concerning the CoFeNi alloys shown in Table 2 of U.S. Pat. No. 6,063,512, it was found that the Fe content was small up to 30 mass % and that the saturated magnetic flux density Bs was up to approximately 1.8 T, that is, was not more than 2.0 T.

In the present invention, according to those experiments, it was found that when the Fe content of a CoFeNi alloy was 50 mass % or more, the saturated magnetic flux density Bs could be increased to 2.0 T or more.

In addition, when the Fe content was too high, coarse crystal grains were preferentially formed, the surface roughness was increased, and in addition, the saturated magnetic flux density Bs was decreased. It was found that when the Fe content was more than 90 mass %, the saturated magnetic flux density Bs was less than 2.0 T.

Next, it was found that when the Ni content was more than 20 mass %, the saturated magnetic flux density Bs was decreased to less than 2.0 T. It was also found that when at least 2 mass % of Ni was not contained, the film was easily peeled due to a significant increase in film stress, and that a passivation film, i.e., a dense oxide film, was not easily formed on the CoFeNi alloy.

From the above experimental results, the composition of the CoFeNi alloy of the present invention is set in the area surrounded by the solid line i in FIG. 8, that is, in the area where the Co content is 8 to 48 mass %, the Fe content is 50 to 90 mass %, and the Ni content is 2 to 20 mass %. When the CoFeNi alloy is in the area described above, the saturated magnetic flux density Bs thereof can be 2.0 T or more.

In the present invention, as a preferable area of the composition, the area surrounded by the dotted line ii is shown in FIG. 8. This composition corresponds to the composition of the CoFeNi alloy formed using the plating solution shown in Table 3 described above. That is, the Co content is 23 to 32 mass %, the Fe content is 58 to 71 mass %, and the Ni content is 2 to 20 mass %. When the component ratios are in the ranges described above, the saturated magnetic flux density Bs can be further increased, such as 2.15 T or more.

In addition, since the formation of coarse crystal grains is suppressed, that is, since a dense film is formed, the surface roughness can be appropriately decreased, and hence, the center line average roughness Ra of the film surface can be decreased to 5 nm or less.

In the present invention, as a more preferable area of the composition, the area surrounded by the chain line iii is shown in FIG. 8. This composition corresponds to the composition of the CoFeNi alloy formed using the plating solution shown in Table 4 described above. That is, the component ratio X of the Co is 23.3 to 28.3 mass %, the component ratio Y of the Fe is 63 to 67.5 mass %, and the component ratio Z of the Ni is 4.2 to 13.6 mass %. When the component ratios are in the ranges described above, the saturated magnetic flux density Bs can be further increased to 2.2 T or more.

In addition, since the formation of coarse crystal grains is suppressed, and a dense film is formed, the surface roughness can be appropriately decreased, and hence, the center line average roughness Ra of the film surface can be controlled to be 5 nm or less.

In the present invention, as the most preferable area of the composition, the area surrounded by the solid line iv is shown in FIG. 8. This composition corresponds to the composition of the CoFeNi alloy formed using the plating solution shown in Table 5 described above. That is, the component ratios, X of Co, Y of Fe, and Z of Ni, are in the area surrounded by three points (X, Y, and Z) of (26.5, 64.6, and 8.9 mass %), (25.5, 63, and 11.5 mass %), and (23.3, 67.5, and 9.2 mass). When the component ratios are in the ranges described above, the saturated magnetic flux density Bs can be further increased to more than 2.2 T.

In addition, since the formation of coarse crystal grains is suppressed, and a dense film is formed, the surface roughness can be appropriately decreased, and hence, the center line average roughness Ra of the film surface can be controlled to be 5 nm or less.

Next, other magnetic properties and film properties of the CoFeNi alloys having the compositions in the ranges shown by i to iv in FIG. 8 will be described with reference to FIGS. 9 to 11.

Figure 9:
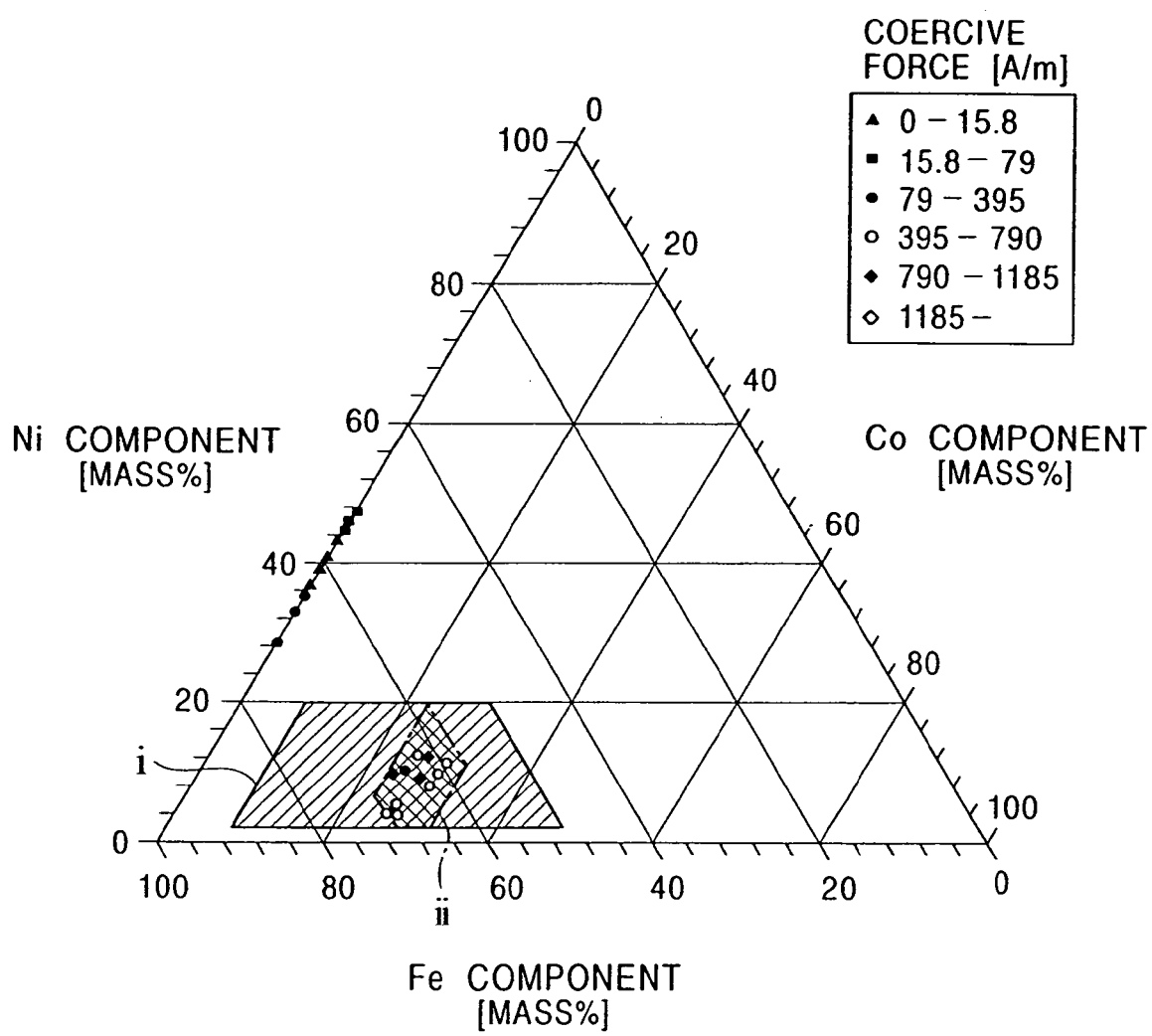
FIG. 9 is a ternary diagram showing the relationship between the composition of a CoFeNi alloy formed by an electroplating method using a pulse current, the composition of an NiFe alloy, and the coercive magnetic force Hc.

FIG. 9 is a ternary diagram showing the relationship of the composition of the CoFeNi alloy and the coercive force. It was found that when the composition of the alloy was in the area shown by i or ii, the coercive force Hc could be decreased to 1,580 A/m or less. This coercive force Hc mentioned above is larger than that of an NiFe alloy; however, when the CoFeNi alloy is used for a magnetic pole of a thin-film magnetic head, a problem may not arise as long as the coercive force is decreased to 1,580 A/m or less.

Figure 10:
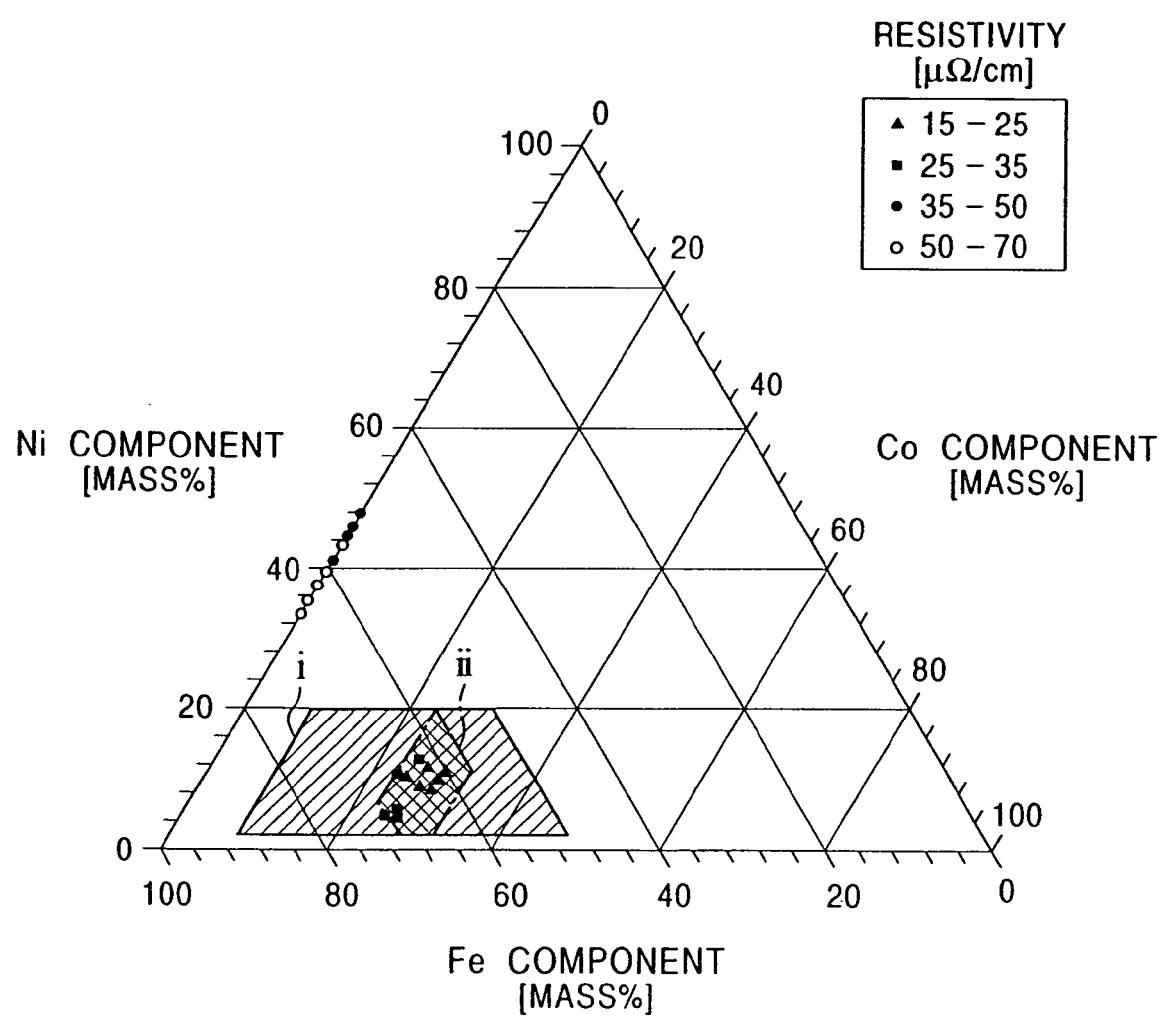
FIG. 10 is a ternary diagram showing the relationship between the composition of a CoFeNi alloy formed by an electroplating method using a pulse current, the composition of an NiFe alloy, and the resistivity.

FIG. 10 is a ternary diagram showing the relationship of the composition of the CoFeNi alloy and the resistivity. It was found that when the composition of the alloy was in the area shown by i or ii, the resistivity could be 15 μΩ·cm or more. In addition, an even higher resistivity can be obtained by an NiFe alloy, and particularly, a resistivity of 35 μΩ·cm or more can be obtained.

Accordingly, as described above, for example, when the CoFeNi alloy of the present invention is used for the upper magnetic pole layer 21 in FIG. 2, and an NiFe alloy is used for the upper core layer 22, the loss caused by eddy current generated in the upper core layer 22 can be reduced, the magnetic flux can smoothly pass from the upper core layer 22 to the upper magnetic pole layer 21, and hence, the magnetic flux can be appropriately concentrated in the upper magnetic pole layer 21.

Figure 11:
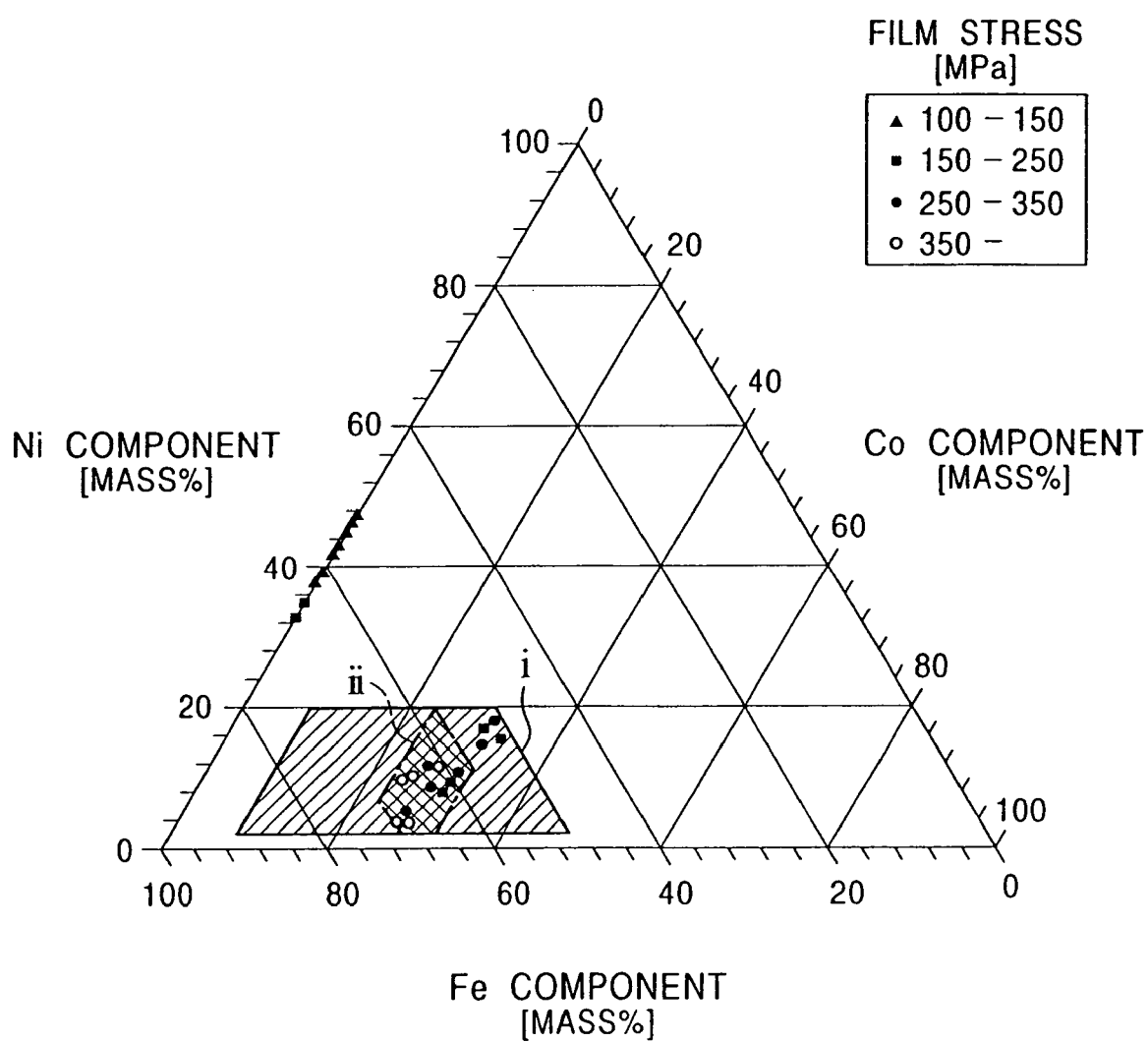
FIG. 11 is a ternary diagram showing the relationship between the composition of a CoFeNi alloy formed by an electroplating method using a pulse current, the composition of an NiFe alloy, and the film stress.

FIG. 11 is a ternary diagram showing the relationship between the composition of the CoFeNi alloy and the film stress. It was found that when the composition of the alloy was in the area shown by i or ii in FIG. 11, the film stress could be reduced to 400 MPa or less. This film stress was high than that of an NiFe alloy; however, when the film stress can be reduced to 400 MPa or less, a problem may not arise even when the CoFeNi alloy is used as a magnetic pole of a thin-film magnetic head.

In the present invention described above in detail, when the component ratio X of Co of a $Co_xFe_y\alpha_z$ alloy is 8 to 48 mass %, the component ratio Y of Fe is 50 to 90 mass %, the component ratio Z of the element α (the element α is at least one of Ni and Cr) is 2 to 20 mass %, and the equation X+Y+Z=100 mass % is satisfied, a saturated magnetic flux density Bs of 2.0 T or more, which is higher than that of an NiFe alloy, can be reliably obtained.

In addition, in the present invention, it is preferable that the component ratio X of Co be 23 to 32 mass %, the component ratio Y of Fe be 58 to 71 mass %, the component ratio Z of Ni be 2 to 20 mass %, and the equation X+Y+Z=100 mass % be satisfied.

In addition, in the present invention, it is more preferable that the component ratio X of Co be 23.3 to 28.3 mass %, the component ratio Y of Fe be 63 to 67.5 mass %, the component ratio Z of the element α be 4.2 to 13.6 mass %, and the equation X+Y+Z=100 mass % be satisfied.

In the present invention, it is most preferable that the component ratios, X of Co, Y of Fe, and Z of the element α, be in the area surrounded by three points (X, Y, and Z) of (26.5, 64.6, and 8.9 mass %), (25.5, 63, and 11.5 mass %), and (23.3, 67.5, and 9.2 mass %), and the component ratios satisfy the equation X+Y+Z=100 mass %.

In the case of the CoFeα alloy of the present invention, since the element α is Ni or Cr which forms a passivation film, even when an NiFe alloy is formed on the CoFeα alloy by plating, a phenomenon in which the CoFeα alloy is ionized and dissolved out can be prevented.

In the present invention, the CoFeα alloy described above can be used as, for example, a core material for a thin-film magnetic head. Consequently, a thin-film magnetic head having a higher recording density and superior corrosion resistance can be manufactured.

What is claimed is:

1. A method for manufacturing a thin-film magnetic head having a soft magnetic film, including a lower core layer, an upper core layer, and a magnetic pole portion which is provided between the lower core layer and the upper core layer and which has the width in the track width direction formed smaller than that of each of the lower core layer and the upper core layer, the method comprising:

forming a lower magnetic pole layer in contact with the lower core layer, an upper magnetic pole layer in contact with the upper core layer, and a gap layer provided between the lower magnetic pole layer and the upper magnetic pole layer so as to form the magnetic pole portion; or, forming an upper magnetic pole layer in contact with the upper core layer, and a gap layer provided between the upper magnetic pole layer and the lower core layer so as to form the magnetic pole portion, wherein at least one of the upper magnetic pole layer and the lower magnetic pole layer is formed of a soft magnetic film by a method of plating, the method comprising:

forming a $Co_xFe_y\alpha_z$ alloy film by electroplating in a plating solution having a Fe ion concentration in the range of 1.0 to 2.0 g/l a ratio of Fe ion concentration to Co ion concentration of 1.5 or more and a ratio of Fe ion concentration to α ion concentration of 2 to 3.4, using a pulse current, wherein the component ratio X of Co is 23.3 to 28.3 mass %, the component ratio Y of Fe is 63 to 67.5 mass %, the component ratio Z of the element α (the element α is at least one of Ni and Cr) is 4.2 to 13.6 mass %, and the equation X+Y+Z=100 mass % is satisfied.

2. A method for manufacturing a soft magnetic film according to claim 1, wherein the plating is performed in a plating solution having a ratio of Fe ion concentration to Co ion concentration of 1.7 or more and a ratio of Fe ion concentration to a ion concentration of 2 to 3.4, whereby a $Co_xFe_y\alpha_z$ alloy film is formed in which the component ratios, X of Co, Y of Fe, and Z of the element α, are in the area surrounded by three points (X, Y, and Z) of (26.5, 64.6, and 8.9 mass %), (25.5, 63, and 11.5 mass %), and (23.3, 67.5, and 9.2 mass %), and the equation X+Y+Z=100 mass % is satisfied.

3. A method for manufacturing a soft magnetic film according to claim 1, wherein the plating solution contains sodium saccharin.

4. A method for manufacturing a soft magnetic film according to claim 1, wherein the plating solution contains 2-butyne-1,4-diol.

5. A method for manufacturing a soft magnetic film according to claim 1, wherein the plating solution contains sodium 2-ethylhexyl sulfate.

6. A method for manufacturing a thin-film magnetic head according to claim 1, wherein the upper magnetic pole layer is formed of the soft magnetic film by plating, and the upper core layer is formed of an NiFe alloy film by electroplating on the upper magnetic pole layer.

7. A method for manufacturing a thin-film magnetic head according to claim 1, wherein either at least one of the upper core layer and the lower core layer has a portion in contact with a magnetic gap and composed of at least two magnetic layers, or at least one of the upper magnetic pole layer and the lower magnetic pole layer is composed of at least two magnetic layers, a magnetic layer in contact with the magnetic gap among the magnetic layers being formed of the soft magnetic film by plating.

8. A method for manufacturing a thin-film magnetic head according to claim 7, wherein the magnetic layers other than the magnetic layer in contact with the magnetic gap layer are formed of an NiFe alloy by electroplating.

9. The method of claim 1, wherein the saturated magnetic flux density Bs of the soft magnetic film is 2.2 T or more and the center line average roughness is 5 nm or less.

* * * * *